United States Patent
Rajnarayan et al.

(10) Patent No.: US 10,634,581 B2
(45) Date of Patent: *Apr. 28, 2020

(54) PREDICTING TRANSITION FROM LAMINAR TO TURBULENT FLOW OVER A SURFACE USING MODE-SHAPE PARAMETERS

(71) Applicants: Dev Rajnarayan, Mountain View, CA (US); Peter Sturdza, Redwood City, AZ (US)

(72) Inventors: Dev Rajnarayan, Mountain View, CA (US); Peter Sturdza, Redwood City, AZ (US)

(73) Assignee: AERION INTELLECTUAL PROPERTY MANAGEMENT CORPORATION, Wilmington, DE (US)

( * ) Notice: Subject to any disclaimer, the term of this patent is extended or adjusted under 35 U.S.C. 154(b) by 675 days.

This patent is subject to a terminal disclaimer.

(21) Appl. No.: 15/335,303

(22) Filed: Oct. 26, 2016

(65) Prior Publication Data

US 2017/0045417 A1 Feb. 16, 2017

Related U.S. Application Data

(63) Continuation of application No. 13/850,628, filed on Mar. 26, 2013, now Pat. No. 9,494,482.

(Continued)

(51) Int. Cl.
*G01M 9/06* (2006.01)
*G06F 17/50* (2006.01)
*G01M 9/08* (2006.01)

(52) U.S. Cl.
CPC .............. *G01M 9/065* (2013.01); *G01M 9/08* (2013.01); *G06F 17/5009* (2013.01);
(Continued)

(58) Field of Classification Search
CPC ...... G01M 9/065; G01M 9/08; G06F 17/5095; G06F 17/5009; G06F 2217/16
See application file for complete search history.

(56) References Cited

U.S. PATENT DOCUMENTS 7,150,427 B1   12/2006   Praisner et al.
7,251,592 B1   7/2007   Praisner et al.
(Continued)

OTHER PUBLICATIONS

"IUTAM Symposium on Laminar-Turbulent Transition" Eds. Govindarajan, Fluid Mechanics & Its Applications, vol. 78 (2006) available from <https://link.springer.com/book/10.1007%2F1-4020-4159-4> (Year: 2006).*

(Continued)

*Primary Examiner* — Jay Hann
(74) *Attorney, Agent, or Firm* — Brownstein Hyatt Farber Schreck, LLP

(57) ABSTRACT

In accordance with embodiments disclosed herein, there are provided methods, systems, and apparatuses for predicting whether a point on a computer-generated aircraft or vehicle surface is adjacent to laminar or turbulent flow is made using a transition prediction technique. A plurality of boundary-layer properties at the point are obtained from a steady-state solution of a fluid flow in a region adjacent to the point. Included in the list of boundary-layer properties are computed coefficients or weights of mode shapes that describe the boundary-layer profiles. A plurality of instability modes are obtained, each defined by one or more mode parameters. A vector of regressor weights is obtained for the known instability growth rates in a training dataset. For each instability mode in the plurality of instability modes, a covariance vector is determined, which is the covariance of a predicted local growth rate with the known instability growth rates. Each covariance vector is used with the vector of regressor weights to determine a predicted local growth (Continued)

rate at the point. Based on the predicted local growth rates, an n-factor envelope at the point is determined.

20 Claims, 15 Drawing Sheets

Related U.S. Application Data

(60) Provisional application No. 61/635,779, filed on Apr. 19, 2012.

(52) U.S. Cl.
CPC ...... *G06F 17/5095* (2013.01); *G06F 2217/16* (2013.01); *Y02T 90/50* (2018.05)

(56) References Cited

U.S. PATENT DOCUMENTS

| | | |
|---|---|---|
| 7,850,126 B2 | 12/2010 | Crouch et al. |
| 8,306,800 B2 | 11/2012 | Mangalam et al. |
| 8,538,738 B2 | 9/2013 | Rajnarayan et al. |
| 2009/0157364 A1 | 6/2009 | Velazquez Lopez et al. |

OTHER PUBLICATIONS

Crouch, J., et al. "Transition Prediction for Three-Dimensional Boundary Layers in Computational Fluid Dynamics Applications" AIAA, vol. 40, No. 8, pp. 1536-1541 (2002) (Year: 2002).*
"IUTAM Symposium on Laminar-Turbulent Transition" Eds. Govindarajan, Fluid Mechanics & Its Applications, vol. 78, (2006) (Year: 2006).*
Non-Final Office Action for U.S. Appl. No. 13/850,628, dated Feb. 8, 2016, 13 pages.
Davis, et al., "Control of Aerodynamic Flows", Delivery Order 0051: Transition Prediction Method Review Summary for Rapid Assessment Tool for Transition Prediction (RATTraP), Interim Report for Sep. 20, 2004-Jun. 15, 2005, © 2005 Lockheed Martin Corporation, 95 pages.
Perraud, et al., "Automatic Transition Predictions Using Simplified Methods", AIAA Journal, vol. 47, No. 11, Nov. 2009, 9 pages.
Rubinstein, et al., "Statistical Prediction of Laminar-turbulent Transition", NASA/CR-2000-210638, ICASE Report No. 2000-50, Dec. 2000, 37 pages.
Sturdza, "An Aerodynamic Design Method for Supersonic Natural Laminar Flow Aircraft", Ph.D. Thesis, Stanford University, Dec. 2003, 198 pages.

* cited by examiner

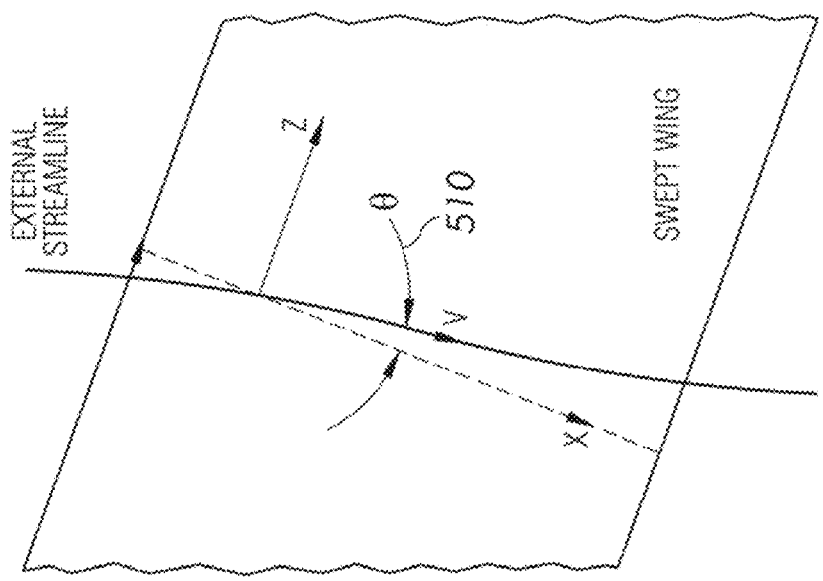
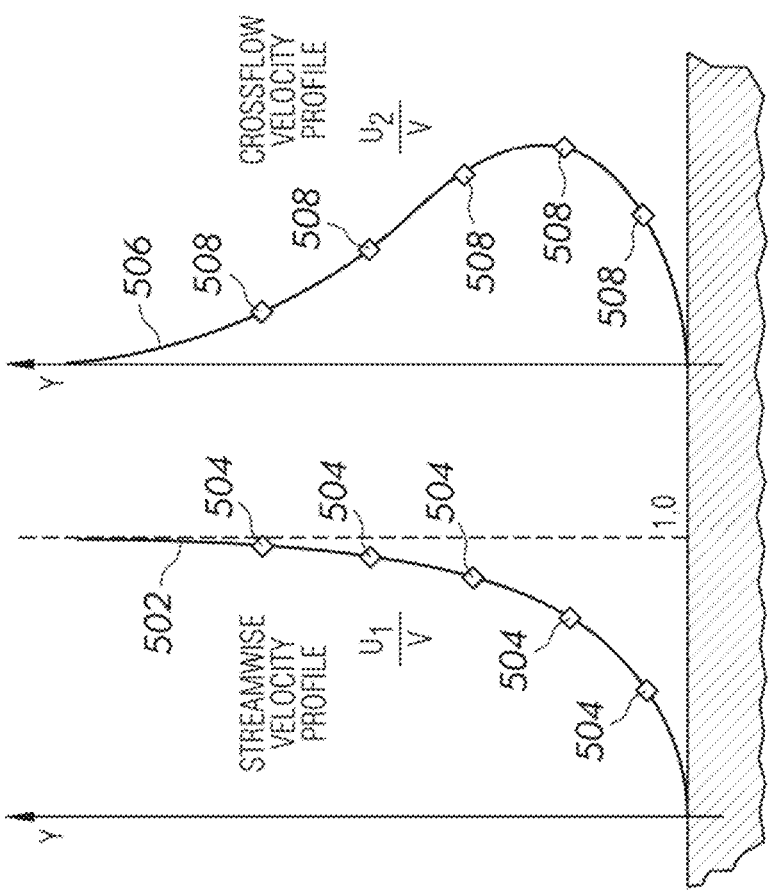
FIG. 5

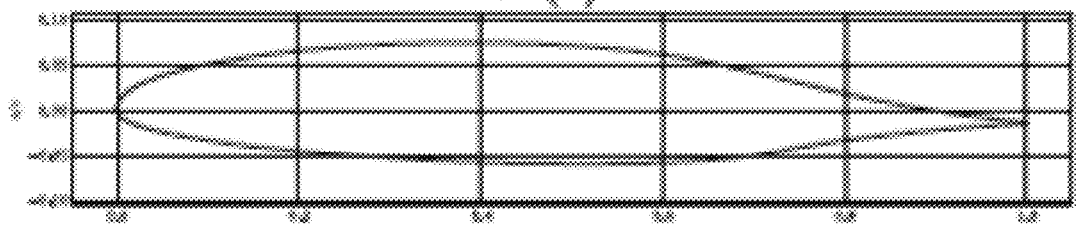
HSNLF(1)-0213
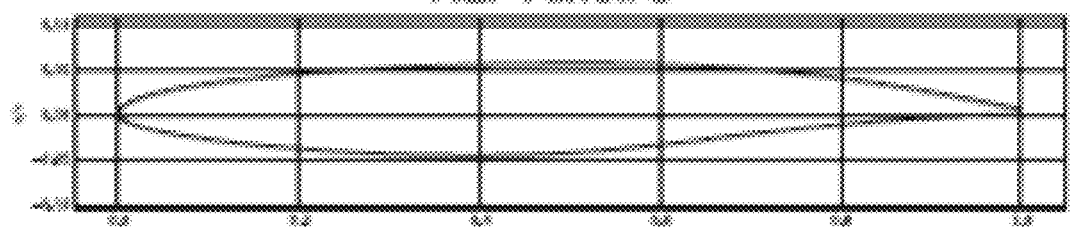
NLF Airfoil 5
NACA1412
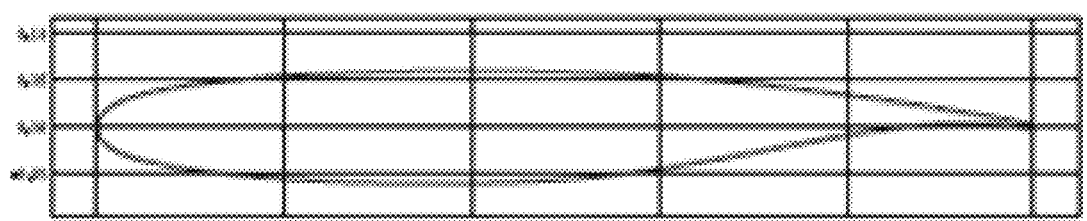
SC(2)-0412
Fig. 14

PREDICTING TRANSITION FROM LAMINAR TO TURBULENT FLOW OVER A SURFACE USING MODE-SHAPE PARAMETERS

CLAIM OF PRIORITY

This application is related to, and claims priority to, U.S. application Ser. No. 13/850,628, filed Mar. 26, 2013, now pending, and is related to, and claims priority to, the provisional utility application entitled "PREDICTING TRANSITION FROM LAMINAR TO TURBULENT FLOW OVER A SURFACE USING MODE-SHAPE PARAMETERS," filed on Apr. 19, 2012, having an application number of 61/635,779, the entire contents of which are incorporated herein by reference.

TECHNICAL FIELD

Embodiments relate generally to the field of simulating a fluid flow over a computer-generated aircraft or vehicle surface and, more specifically, to predicting whether a point on an aircraft or vehicle surface is adjacent to laminar or turbulent flow.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to the claimed embodiments.

Aerodynamic analysis of an aircraft moving through a fluid typically requires an accurate prediction of the properties of the fluid surrounding the aircraft. Accurate aerodynamic analysis is particularly important when designing aircraft surfaces, such as the surface of a wing or control surface. Typically, the outer surface of a portion of the aircraft, such as the surface of a wing, is modeled, either physically or by computer model, so that a simulation of the fluid flow can be performed and properties of the simulated fluid flow can be measured. Fluid-flow properties are used to predict the characteristics of the wing including lift, drag, boundary-layer velocity profiles, and pressure distribution. The flow properties may also be used to map laminar and turbulent flow regions near the surface of the wing and to predict the formation of shock waves in transonic and supersonic flow.

The present state of the art may therefore benefit from simulating a fluid flow over a computer-generated aircraft or vehicle surface and, more specifically, to predicting whether a point on an aircraft or vehicle surface is adjacent to laminar or turbulent flow as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 5 depicts the crossflow and streamwise velocity profiles and the angle between the reference axis and the external streamline;

FIG. 14 depicts a set of representative airfoils for generating a training dataset of known instability local growth rates for individual modes;

DETAILED DESCRIPTION

Figure 1:
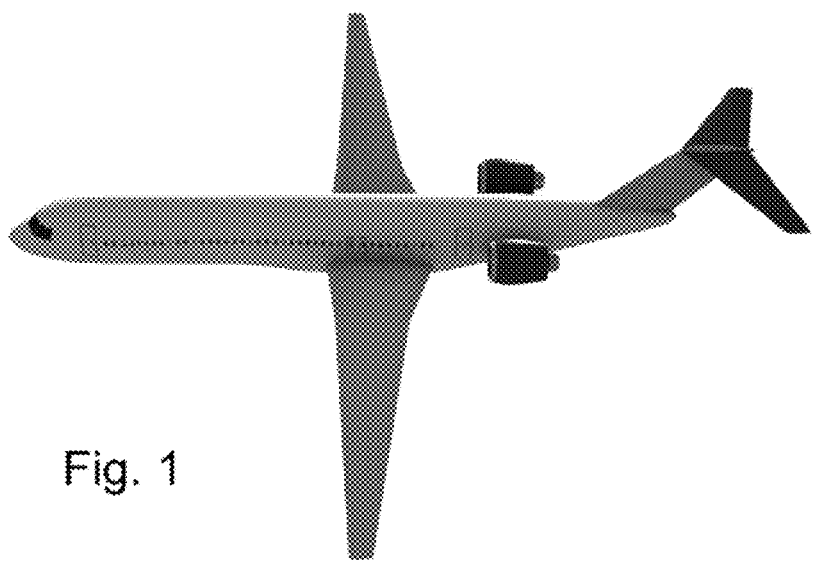
FIG. 1 depicts a supersonic natural-laminar flow concept jet.

Described herein are systems, devices, and methods for predicting transition from laminar to turbulent flow over a surface using mode-shape parameters.

In one embodiment, such mechanisms include predicting whether a point on a computer-generated aircraft or vehicle surface is adjacent to laminar or turbulent fluid flow. For example, such means may include (a) obtaining a plurality of boundary-layer properties, including coefficient weights of mode-based profile descriptions, at the point on the computer-generated aircraft or vehicle surface using a steady-state solution of a fluid flow in a region adjacent to the point; (b) obtaining a plurality of instability modes, wherein one or more mode parameters define each instability mode; (c) obtaining a vector of regressor weights of known instability growth rates in a training dataset; (d) for each instability mode in the plurality of instability modes: (i) determining a covariance vector comprising the covariance of a predicted local growth rate for the point with respect to each of the known instability growth rates in the training dataset; (ii) determining a predicted local growth rate at the point for the instability mode using the vector of regressor weights and the covariance vector; and (e) determining an n-factor envelope at the point for the plurality of instability modes using the predicted local growth rates, wherein the n-factor envelope is indicative of whether the point is adjacent to laminar or turbulent flow.

A computer-generated simulation can be performed on a computer-generated aircraft surface to simulate the fluid dynamics of a surrounding fluid flow. The geometry of the computer-generated aircraft surface is relatively easy to change and allows for optimization through design iteration or analysis of multiple design alternatives. A computer-generated simulation can also be used to study situations that may be difficult to reproduce using a physical model, such as supersonic flight conditions. A computer-generated simulation also allows a designer to measure or predict fluid-flow properties at virtually any point in the model by direct query, without the difficulties associated with physical instrumentation or data acquisition techniques. In this way, computer-generated simulations allow a designer to select an aircraft surface design that optimizes particular fluid-flow characteristics.

In some cases, a portion of an aircraft surface, such as a wing surface, can be optimized to maximize regions of laminar flow. A region of fluid flow may be considered laminar when the flow tends to exhibit layered or sheet-like flow. In laminar-flow regions there is little mixing between the layers or sheets of fluid flow having different fluid velocities. Laminar flow can be contrasted to turbulent flow which tends to exhibit chaotic or erratic flow characteristics. In turbulent-flow regions there is a significant amount of mixing between portions of the fluid flow having different fluid velocities.

Near the surface of a wing, the fluid flow typically begins as laminar flow at the leading edge of the wing and becomes turbulent as the flow progresses to the trailing edge of the wing. The location on the surface of the wing where the fluid flow transitions from laminar to turbulent is called a transition point. The further the transition point is from the leading edge, the larger the region of laminar flow.

There are many advantages to aircraft utilizing laminar flow over large portions of the fuselage and wing surfaces. In general, laminar flow dissipates less energy than turbulent flow. Increasing the proportion of laminar flow regions over a wing surface reduces drag, and therefore, reduces fuel burn, emissions, and operating costs.

According to one model, the transition to turbulent flow is caused by the growth of instabilities in the boundary-layer fluid flow adjacent to the aircraft surface. These instabilities may be initiated by, for example, surface contamination, roughness, vibrations, acoustic disturbances, shockwaves, or turbulence in the free-stream flow. The instabilities start out as small, periodic perturbations to the fluid flow near the aircraft surface, then grow or decay depending on the properties of the boundary layer, such as flow velocity and temperature profiles. At first, when the instabilities are small, their behavior is similar to sinusoidal plane wave instabilities and can be described by linearized perturbation equations. As the unstable modes grow in amplitude, non-linear interactions become dominant. Following the nonlinear growth, the laminar instabilities begin causing intermittent spots of turbulence which spread and eventually merge together resulting in a fully turbulent boundary layer.

When predicting the location that a laminar flow transitions to turbulent flow, designers may consider many different types of instabilities. These types include Tollmien-Schlichting (TS) wave instabilities and crossflow vortices. The type of instability may depend, in part, on the geometry of the aircraft, such as the degree of sweep of the wing.

For a given instability type (e.g., TS wave or crossflow vortex), there are typically multiple individual instability modes that may be defined using mode parameters, such as temporal frequency and/or spatial spanwise wave number. By considering a range of individual instability modes when simulating a fluid flow around the aircraft surface, designers may account for a variety of potential instability sources.

In general, transition prediction techniques allow a designer to estimate the point on an aircraft surface where laminar flow first transitions to turbulent flow. In some cases, designers may attempt to maximize regions of laminar flow by designing the surface of the wing so that the transition point is as far from the leading edge as possible. Producing useful results often requires running complex simulations over a wide range of design variables and flight conditions. Unless the transition prediction technique is efficient and easy to use, running multiple complex simulations may be prohibitively time-consuming in the earlier stages of aircraft design where major configuration changes are likely.

Linear stability theory (LST) is one technique that may be used to model the growth of instabilities in a boundary-layer fluid flow around a computer-generated aircraft surface. LST models these instabilities as spatio-temporal waves that are amplified or attenuated as the flow progresses along the boundary layer. This modeling requires the solution of an eigenvalue problem. Input to an LST-based analysis includes a boundary-layer solution and values parameterizing a selected instability mode (e.g., wave number and frequency). The input boundary-layer solution, includes, for example, boundary-layer properties such as flow velocity and temperature and can be determined using a time-invariant computational fluid dynamics (CFD) simulation module. As an output, LST-based analysis computes an instability local growth rate associated with the selected instability mode at a given point on the aircraft surface.

While LST-based analysis may produce accurate results, LST-based analysis may be prohibitively time-consuming in early design phases. LST-based analysis may require the user to interact with the analysis frequently to check for lost modes and non-physical results. This interaction is not only time-consuming, but also requires that the user have experience interacting with the specific implementation of the LST-based analysis. Thus, even with powerful computing resources, LST-based analysis may be impractical when iterating through a large number of design configurations in the early phases of aircraft design.

Other techniques that require less user interaction but may sacrifice accuracy or reliability. Without high accuracy and reliability, such techniques are less useful for iterating design configuration in the early phases of aircraft design.

The techniques described herein can be used to generate a growth-rate model that reduces or eliminates the need for user interaction. Further, iteration of the techniques described herein can be used to provide a prediction of the transition point on a computer-generated aircraft surface.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems where are not directly discussed.

FIG. 1 illustrates a transonic natural-laminar-flow (NLF) concept jet.

Figure 2:
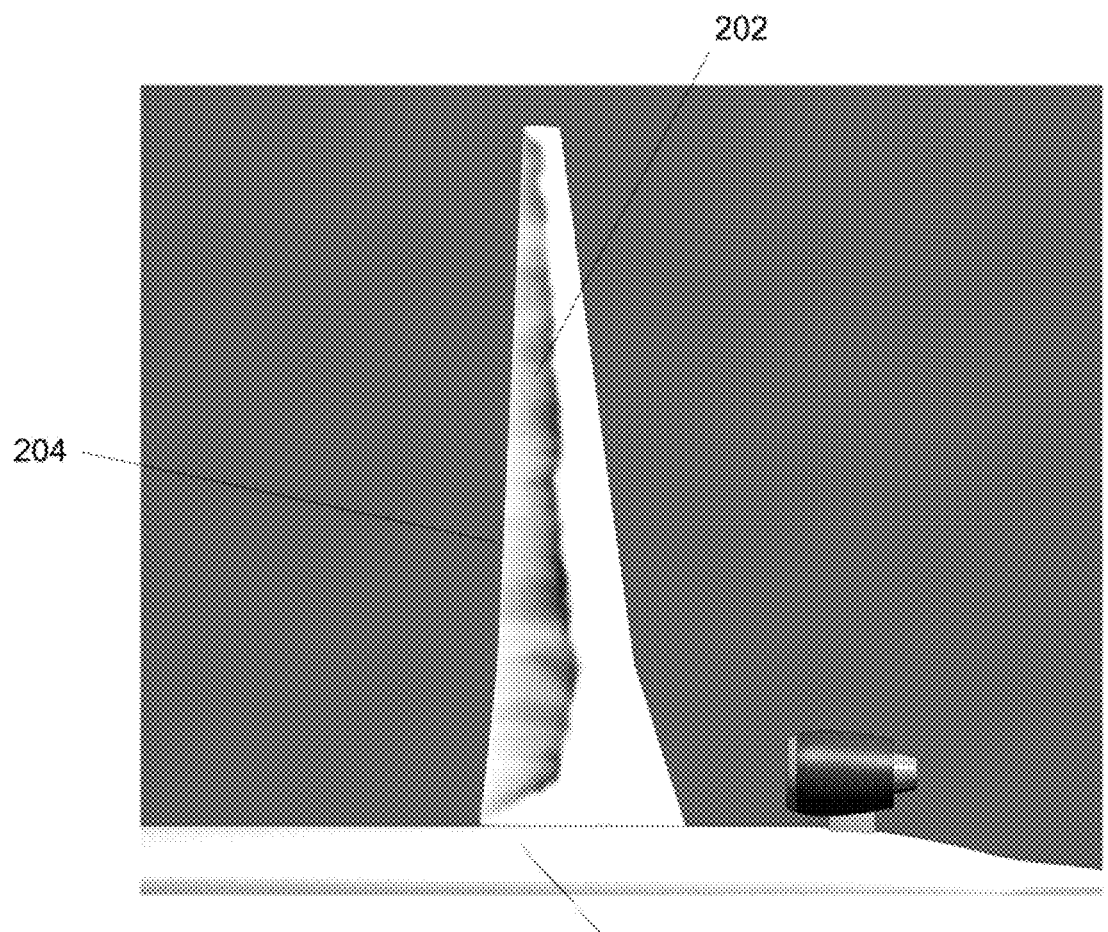
FIG. 2 depicts a computer-generated simulation of fluid flow over the surface of a natural laminar flow concept jet.

FIG. 2 shows a top view of a computer-generated simulation of the NLF jet. The shading on the wing 202 is proportional to the combined TS and crossflow instabilities on the upper surface at Mach 0.75 at 33,000 feet. The white areas on the wing 202 indicate regions where turbulent flow is predicted. As seen in FIG. 2, locations near fuselage 200 exhibit turbulent flow closer to the leading edge 204 of the wing 202 as compared to locations further away from fuselage 200.

The results depicted in FIG. 2 are an example of the output of a computer-generated simulation that allows a designer or engineer to evaluate the performance of an aircraft surface with respect to laminar flow. If necessary, changes can be made to the aircraft surface geometry to optimize or increase the amount of laminar flow. Additional simulations can be performed for modified aircraft surface geometry and the results can be compared. To allow for multiple design iterations, it is advantageous to perform multiple simulations in a short amount of time. The following technique can be used to provide an accurate prediction of the transition point in a way that reduces simulation time and human interaction.

Figure 3A:
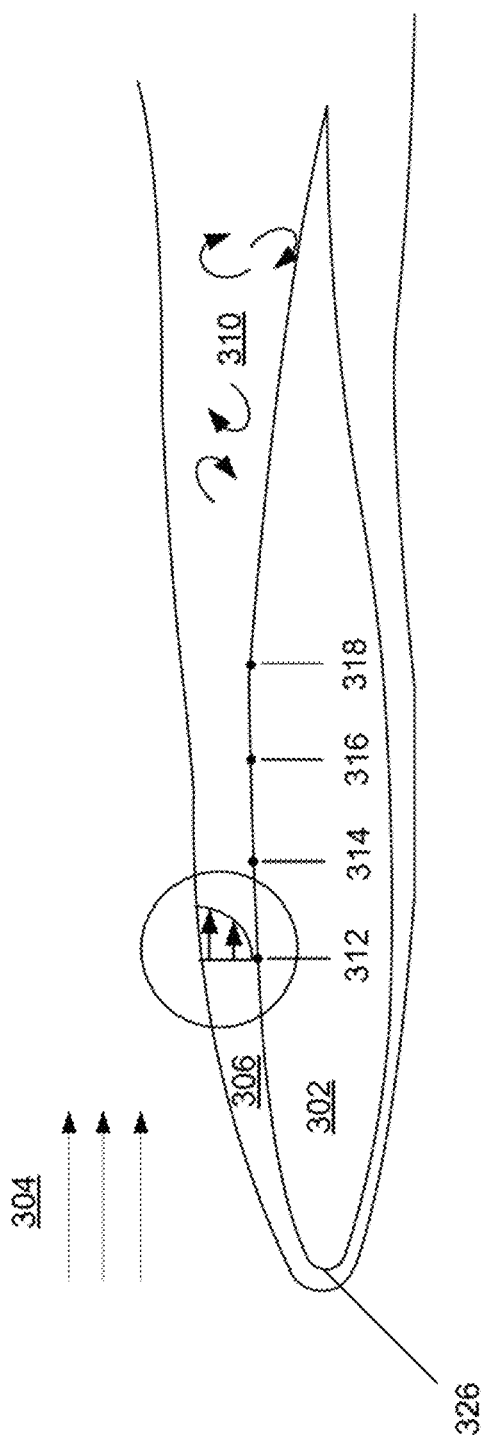
FIGS. 3a and 3b depict an exemplary fluid flow over a wing.
Figure 3B:
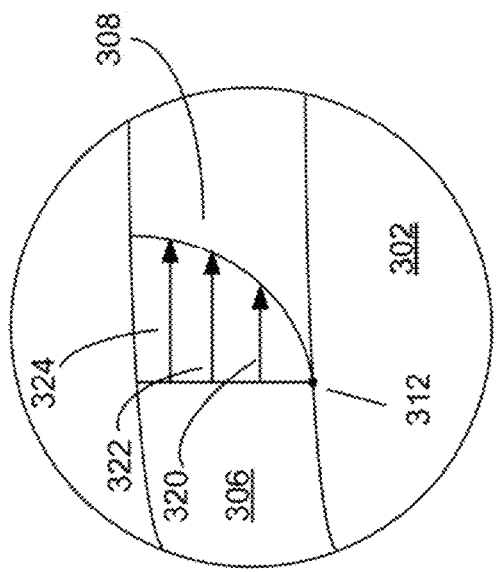

FIGS. 3a and 3b depict an exemplary aircraft surface, a wing section 302, and a two-dimensional representation of a fluid flow. The fluid flow is classified by two regions: outer region 304 and boundary-layer region 306, 310. As shown in FIGS. 3a and 3b, the laminar flow portion 306 of the boundary-layer region begins near the leading edge 326 of the wing surface 302 and is characterized by a sharply-increasing velocity profile 308. Skin friction causes the fluid velocity close to the wing surface 302 to be essentially zero, with respect to the surface. The sharply-increasing velocity profile 308 develops as the velocity increases from a near-zero velocity to the boundary-layer edge velocity.

The fluid flow within the boundary-layer having a velocity profile 308 may be considered laminar because of the layered or sheet-like nature of the fluid flow. However, the growth of instabilities within the boundary layer may result in turbulent flow 310 further down stream from the leading edge. Transition prediction estimates the location on the surface of the wing where the fluid flow in the boundary layer changes from laminar to turbulent.

Figure 4:
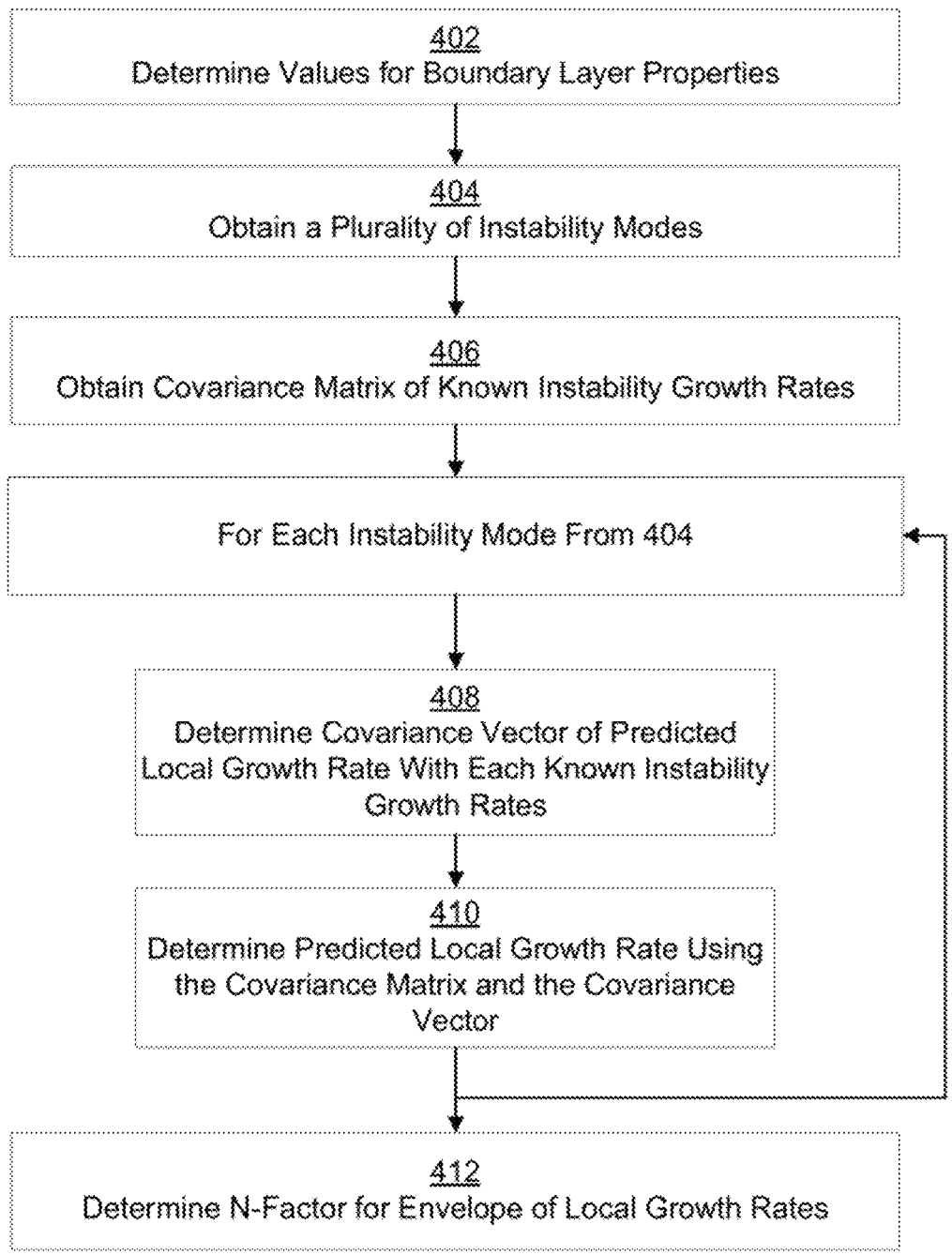
FIG. 4 depicts an exemplary technique for predicting a point on an n-factor envelope.

FIG. 4 depicts a flow chart for an exemplary process 400 for predicting whether fluid flow near a point of interest (POI) on a computer-generated aircraft surface is laminar or turbulent. The exemplary technique is suitable for integration into a computer-generated simulation. Operations described in the flow chart may be repeated on a point-by-point basis across the computer-generated aircraft surface to produce an envelope curve. The fluid flow is predicted to transition to turbulent flow at the location where the envelope, discussed in operation 412 below, exceeds a threshold or critical value. For example, referring to FIG. 3a, the technique may be performed for each surface point 312, 314, 316, 318 to construct an envelope curve used to determine the transition point on the wing surface 302.

The computer-generated aircraft surface may include, for example, a portion of an airfoil surface or a part of a fuselage surface obtained from a computer-aided design (CAD) computer software package. In some cases, the computer-generated aircraft surface includes a surface mesh of polygons, such as a mesh of triangles that represents the surface of the aircraft. A fluid-flow mesh may also be defined representing a fluid-flow region adjacent to the computer-generated aircraft surface. In some cases, the fluid-flow mesh is generated using, for example, a mesh generation program or a computation-fluid dynamics (CFD) simulation module that contains automated mesh generation functionality.

The POI on the computer-generated aircraft surface where a point on the envelope curve is to be determined may be selected using the surface mesh of polygons. For example, the POI may be a vertex of one of the polygons or a geometrical feature such as a centroid of one of the polygons. Alternatively, the POI may be an arbitrary point on the computer-generated aircraft surface that is not associated with any particular feature of the surface mesh.

In operation 402 of the process 400, values are determined for boundary-layer properties of the fluid flow near the POI.

Exemplary boundary-layer fluid properties may include flow velocity, fluid pressure, and temperature (or density or any other relevant quantity describing the fluid or gas thermodynamic state). The values of these properties vary as the POI is chosen to be at different locations on the computer-generated aircraft surface.

In some cases, a CFD simulation module can use the surrounding fluid flow mesh to determine the values of the boundary-layer fluid properties. In some cases, the results of the CFD simulation module represent a steady-state solution of the surrounding fluid flow. Values for the boundary-layer properties relevant to the POI on the computer-generated aircraft surface are extracted from the steady-state solution. The boundary-layer properties are selected depending on their influence in determining whether fluid flow is laminar or turbulent near the POI.

In some cases, one or more fluid cells of the fluid-flow mesh are identified as representing a portion of the boundary-layer fluid flow near the POI on the computer-generated aircraft surface. Values of selected boundary-layer properties are extracted from the identified fluid cells. Exemplary boundary-layer properties that may be relevant to predicting transition include local Reynolds number, velocity ratios, and wall-to-external temperature ratios. The relevant boundary-layer properties may depend, in part, on the type of instability being analyzed.

The particular boundary-layer properties that are determined in operation 402 may depend on the type of instabilities (e.g., TS wave or crossflow vortex) under consideration. Depending on the type of instability, different sets of boundary-layer properties may be relevant to transition prediction. Therefore, each type of instability being analyzed may require different sets of boundary-layer properties and mode parameters.

For example, for TS-wave instabilities with reference to FIG. 5, relevant boundary-layer properties may include a Reynolds number defined by $R = u_e l/v_e$ where $l = \sqrt{v_e x/u_e}$, the local Mach number at the boundary-layer edge, five points 504 along the streamwise velocity profile 502, five points 508 along the crossflow velocity profile 506, five points along the temperature profile, and the angle between the reference axis and the external streamline 510.

In another example for TS-wave instabilities, instead of describing the velocity or temperature profiles using points along those profiles, a superposition of mode shapes may be used to describe those profiles. One such family of mode shapes may be derived from the linear algebra technique called the Singular Value Decomposition (SVD). Decomposing a given profile into a constituent mode involves a projection using the standard mathematical technique called the dot product.

Figure 18:
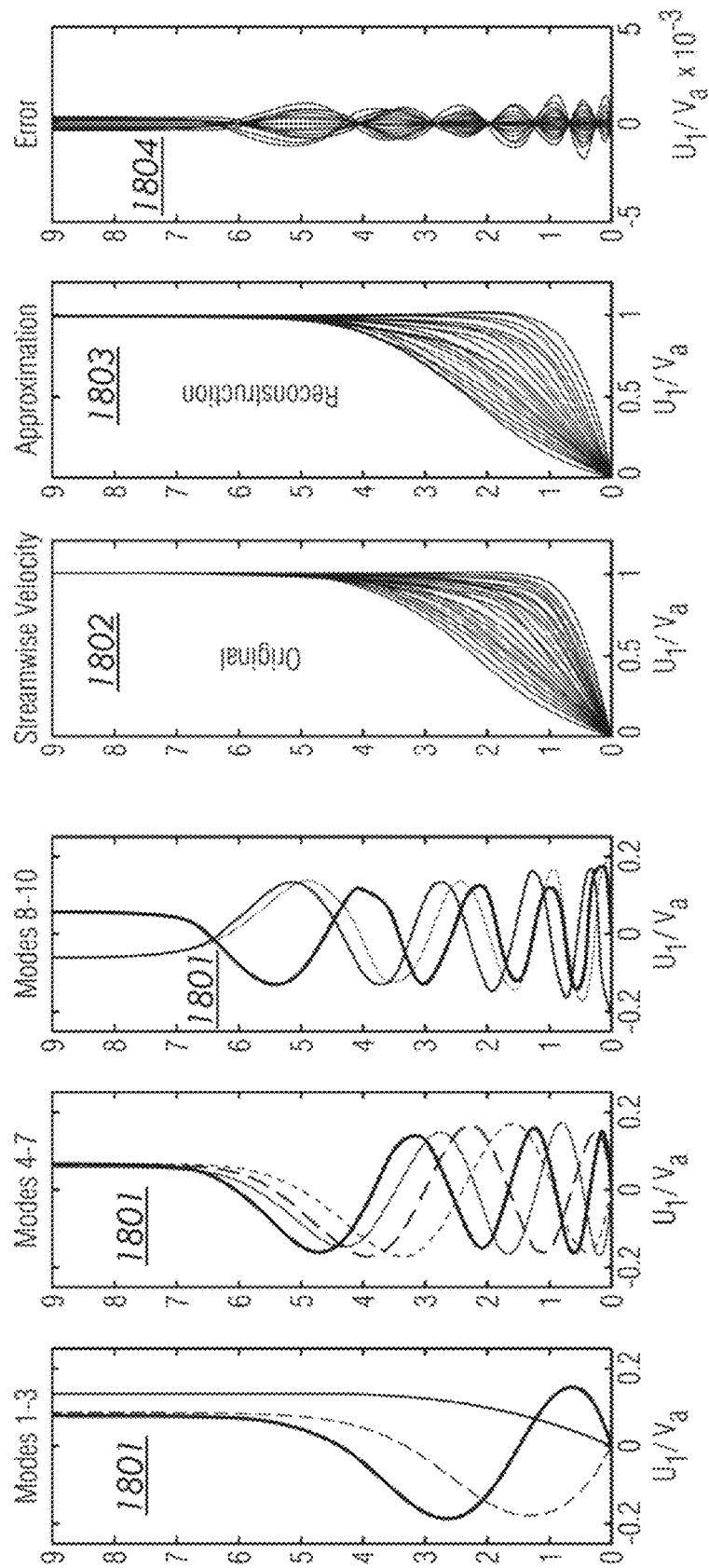
FIG. 18 depicts a mode-shape parameterization of a velocity profile using the Singular Value Decomposition method.

FIG. 18 depicts the first ten modes 1801 of an SVD decomposition of streamwise velocity profiles of actual boundary layers 1802. Only the first seven modes are used in the reconstruction 1803. The error between the actual profiles 1802 and the reconstructed profiles 1803 is depicted 1804 using a zoomed-in scale. Using this method, the relevant boundary-layer properties necessary to describe a velocity or temperature profile become a vector, or array, of weights that multiply each mode. For the streamwise profiles depicted in FIG. 18, seven modes are used and therefore the corresponding seven weights are added to the list of boundary-layer parameters. A second and third vector of parameters may be used to describe the crossflow velocity profile and the temperature profile.

Figure 6:
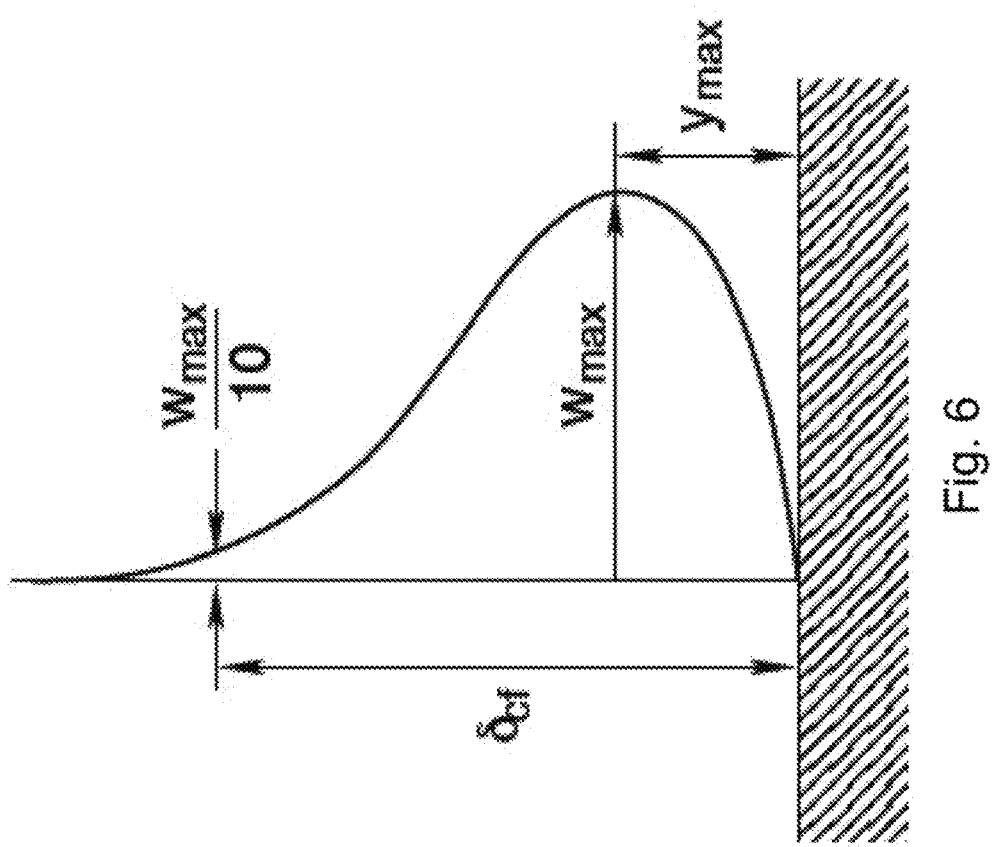
FIG. 6 depicts a crossflow velocity profile.

In another example, for stationary crossflow instabilities with reference to FIG. 6, relevant boundary-layer properties may include:

crossflow Reynolds number:

$$\frac{\rho u_e \delta_{cf}}{\mu};$$

crossflow velocity ratio:

$$\frac{|w_{max}|}{u_e};$$

crossflow shape factor:

$$\frac{|y_{max}|}{\delta_{cf}};$$

and the ratio of the wall temperature to external temperature.

In the examples given above, only four boundary-layer properties are used when considering stationary crossflow vortices, while twenty boundary-layer properties are used when considering TS-wave instabilities.

In yet another example, the same boundary-layer properties may be used for both crossflow vortices and TS-wave instabilities. In this example, the twenty boundary-layer properties discussed above with respect to TS-wave instabilities may also be used for crossflow vortices.

In a further example, boundary-layer properties that include mode-shape parameterizations of the velocity and temperature profiles may be used for crossflow vortices using a technique such as the SVD method described above.

While specific examples of boundary-layer properties for particular types of instabilities are given above, these examples should not be read to limit the boundary-layer properties that are used. The boundary-layer properties may be chosen to give the best results.

In operation 404, a matrix of parameters defining a plurality of instability modes is constructed. In an example of operation 404, each mode in the matrix of modes is defined using at least one of two mode parameters: a temporal frequency and a spatial spanwise wave number.

The mode parameters used to define the set of instability modes in the matrix may depend, in part, on the type of instability being analyzed. For example, for stationary crossflow vortices, the instability modes may have a temporal frequency of zero. Thus, the matrix for crossflow vortices is defined using a range of wave numbers and a single (zero) temporal frequency. In another example, for TS-wave instabilities, the instability modes may be defined using both a temporal frequency and a spatial spanwise wave number. Values for wave numbers and frequency parameters may be selected at equal intervals across a range of interest.

In operation 406, a vector of regressor weights of the known instability growth rates in a training dataset is obtained. In some cases where the vector of regressor weights has previously been constructed, operation 406 may be accomplished by loading the vector of regressor weights from memory.

If the vector of regressor weights has not been previously constructed, access to a training dataset is required. The training dataset includes a plurality of known instability growth rates, each known instability growth rate having a corresponding input vector. The known instability growth rates are based on the input vector and determined using a source that is considered to be accurate. In some cases, LST-based analysis may be used to determine the known instability growth rates. LST-based analysis is discussed below with respect to FIG. 15.

The training input vector includes boundary-layer properties and at least one mode parameter. The training input vector represents the input used to calculate the known instability growth rate. Typically, multiple training input vectors are defined to represent multiple training instability modes, each training instability mode using the same boundary-layer property values. Creation of the training dataset is further discussed below with respect to FIG. 8.

The vector of regressor weights $\beta$ may be determined based on a covariance matrix $\Sigma_1$ of the known instability growth rates in the training dataset and a vector of the known instability growth rates $\alpha_k$ in the training dataset according to Equation 1:

$$\beta = \Sigma_1^{-1} \alpha_k.$$

Each element of the covariance matrix $\Sigma_1$ specifies the covariance of one known instability growth rate in the training dataset with another known instability growth rate in the training dataset. The covariance matrix $\Sigma_1$ is the correlation matrix multiplied by the variance $\sigma_0^2$, which may be determined using the expected range of variation in growth rates and an optimization technique (e.g., marginal likelihood) with training data. If the training dataset includes m known instability growth rates, then the size of the correlation matrix and the covariance matrix will be m×m. An element $\Sigma_{ij}$ of the covariance matrix $\Sigma_1$ is the correlation of the $i^{th}$ known instability growth rate $\alpha_i$ to the $j^{th}$ known instability growth rate $\alpha_j$ multiplied by the variance $\sigma_0^2$ as shown in Equation 2:

$$\Sigma_{ij} = \sigma_0^2 \, \mathrm{corr}(\alpha_i, \alpha_j).$$

In one example of the covariance matrix, the correlation between two known instability growth rates $\alpha_i$ and $\alpha_j$ is based on the distance between the input vectors $x_i$ and $x_j$ as shown in Equation 3:

$$\mathrm{corr}(\alpha_i, \alpha_j) = r(x_i, x_j),$$

where r is a correlation function based on the distance between the input vectors $x_i$ and $x_j$.

In this example, the correlation function r is chosen based on the assumption that changes in the growth rate are smooth with respect to changes in the input vector. In other words, the correlation function r is chosen based on the assumption that the growth rates are infinitely differentiable with respect to the input vector. A squared exponential covariance function is an example of one correlation function that is consistent with this assumption. A squared exponential covariance function is set forth as Equation 4:

$$r(x_i, x_j) = \exp\left(-\sum_{k=1}^{n}\left[\frac{x_i^{(k)} - x_j^{(k)}}{\tau_k}\right]^2\right),$$

where the input vectors include n elements (boundary-layer properties and one or more mode parameters), $\tau_k$ is a length-scale parameter for the $k^{th}$ element of the input vectors, and $x_i^{(k)}$ is the value of the $k^{th}$ element of the input vector that is associated with the known instability growth rate $\alpha_i$. The length-scales may be calculated using an optimization technique such as marginal likelihood (ML-II maximization) using part of the training dataset where there is sufficient data. Other covariance functions may be used that make other assumptions about the relation between the growth rates and the input vectors. If, for example, the profiles are parameterized using a mode-shape technique (such as SVD), then the weights of the different modes would form part of the input vector. Alternatively, one could parameterize some profiles using a number of points along the profile, and others using the SVD. In this second example, the correlation could be split into parts that are subsequently multiplied. The first part involves the profiles parameterized using a number of points. The normalized vector dot product:

$$r'(x_i, x_j) = \frac{x_i \cdot x_j}{\|x_i\| \|x_j\|}$$

could be used to compute the correlation (and hence the mutual similarity) between each of these profiles. The second part of the correlation is computed by applying the formula in equation 4 to the rest of the parameters. The resulting correlations, each applicable to a separate portion of the inputs, are then multiplied together to arrive at the combined correlation function.

Thus, for cases where the vector of regressor weights must be calculated, equations 1-4 may be used. As long as the training dataset does not change, the vector of regressor weights will not change. Accordingly, after calculating the vector of regressor weights, it may be stored for future use when performing the exemplary technique on other points using the same training dataset.

Operations 408 and 410 are performed for each instability mode from the matrix constructed in operation 404. In the discussion of operations 408 and 410 below, the term "current instability mode" refers to one instability mode of the plurality of instability modes from operation.

In operation 408, a covariance vector is calculated. The covariance vector comprises the covariance of a predicted instability local growth rate $\alpha_0$ at the POI with respect to each of the known instability growth rates in the training dataset. Thus, access to the training dataset is required for operation 408.

The covariance vector may be calculated in the same manner as explained above with respect to operation 406 except using the input vector $x_0$ for $\alpha_0$ that includes the boundary-layer properties at the POI from operation 404 and at least one mode parameter describing the current instability mode. The covariance vector has m elements.

In operation 410, the predicted instability local growth rate is determined using the vector of regressor weights and the covariance vector $\Sigma_2$. For example, Equation 5

$$\alpha_0 = \Sigma_2 \beta + \mu,$$

may be used to predict the instability local growth rate at the POI, where $\mu$ is the prior mean, which specifies the instability local growth rate far away from the input vectors included in the training dataset. In some cases, the prior mean may be zero.

Optionally, a confidence measure may be determined for each instability local growth rate determined in operation 410 based on the variance of the predicted instability growth rate. The confidence measure may, for example, be useful in determining whether the training dataset is suitable for transition prediction on the current computer-generated aircraft surface. A low confidence measure may indicate that the user should update the training dataset.

The variance of the predicted instability local growth rate may be determined according to Equation 6:

$$\text{cov}(\alpha_0) = \Sigma_3 \Sigma_1^{-1} \Sigma_3^T,$$

where $\Sigma_3$ is the covariance vector of the predicted instability local growth rate with respect to the known instability growth rates in the training dataset and $\Sigma_1$ is the covariance matrix discussed in operation 406 above. The vector $\Sigma_3$ may be determined according to the method described above with respect to equations 2-4.

In operation 412, a point on the n-factor envelope is determined based on the instability local growth rates from operation 410 for each instability mode from operation 404. A point on the n-factor envelope represents a composite of all the individual n-factors due to the different instability modes. Generally, the point on the n-factor envelope is the largest n-factor at the point of all the instability modes.

An individual n-factor represents the overall amplification or attenuation of an instability mode at a particular point. The n-factor at a point accounts for the cumulative effect of all amplification or attenuation that occurs prior to that point. In general, instabilities that become amplified beyond a threshold indicate the presence of turbulent flow. In some cases, this threshold is called the critical point.

An example process for determining a point on the n-factor envelope includes calculating an n-factor for each instability mode at the POI using equation 2, below. The n-factor n for a given point x may be expressed as Equation 7:

$$n(x) = \int_{xi_0}^{x} -\alpha(x') \, dx',$$

where $-\alpha(x')$ is the predicted instability local growth rate at point x' as calculated in operation 410 and $xi_0$ is the neutral point, which is the streamwise point where the instabilities start to grow. To calculate the n-factor for the POI, it may be necessary to determine instability local growth rates at other points besides the POI. For example, instability local growth rates for streamwise points between the POI and the neutral point may be needed. Operations 404 and 408 discussed above may be used for each streamwise point to determine the required instability local growth rates.

Optionally, a confidence measure may be determined for each of the individual n-factors determined in operation 412. The confidence measure may, for example, be useful in determining whether the training dataset is suitable for transition prediction on the current computer-generated aircraft surface. A low confidence measure may indicate that the user should update the training dataset.

In one case, the confidence measure is determined based on the variance of the n-factor. The variance may be determined by approximating the integral in equation 6 by numerical integration as being a weighted sum of the individual instability growth rates from $x_0$ to x or $$\sum_{i=1}^{n} -\alpha_i c_i,$$

where $-\alpha_i$ is the predicted instability growth rate at $x_i$, $c_i$ is the weight coefficient for $-\alpha_i$, and there are n predicted instability growth rates between $x_0$ and x. The variance of the n-factor may then be determined according to Equation 8:

$$\text{cov}(n(x)) = c^T \Sigma_4 \Sigma_1^{-1} \Sigma_4^T c,$$

where c is a weight coefficients vector for the numerical integral above, $\Sigma_4$ is the covariance matrix of the n growth rates in the numerical integral above with respect to the known instability growth rates in the training dataset, and $\Sigma_1$ is the covariance matrix discussed in operation 406 above. The matrix $\Sigma_4$ may be determined according to the method described above with respect to equations 2-4.

After determining n-factors at the POI for each instability mode from operation 406, the point on the n-factor envelope can be determined. The point on the n-factor envelope may be determined by calculating a pointwise maximum of the individual mode n-factors. However, using the pointwise maximum for the point on the n-factor envelope may lead to a non-smooth or irregular n-factor envelope (when viewed as a curve across the computer-generated aircraft surface). Sometimes a smooth envelope may be preferred, which may be provided by the following alternative example. A weighted average σ of individual mode n-factors may be calculated as shown in equation 3, below using Equation 9:

$$\sigma(n_1, \ldots, n_k) = \frac{\sum_{i}^{k} n_i \exp(n_i)}{\sum_{i}^{k} \exp(n_i)},$$

where $n_k$ is the n-factor for the individual mode k. As the n-factor for an individual mode becomes larger compared to the rest of the n-factors, σ will approach the true maximum.

However, because σ is a weighted average, σ will always be a little less than the true maximum. The formula may be modified using the equivalent of a safety factor. A safety factor may be appropriate especially when all of the n-factors are small and are about the same value. Equation 4, below, provides one example for calculating a point on the n-factor envelope by applying a suitable safety factor to a weighted average σ of the n-factors for the individual modes as in Equation 10:

$$n = \sigma \left[ 1 + 0.25 \left( 1 - \frac{\sigma}{10} \right)^2 \right].$$

After determining the point on the n-factor envelope with respect to the POI, the point can be compared to a threshold value or critical point to determine whether the POI is adjacent to laminar or turbulent flow. For example, a threshold value or critical point for transition prediction may be based on empirical data for sufficiently similar boundary layers. If the point on the n-factor envelope (at the POI) is less than the threshold value or critical point, then the flow near the POI is considered laminar. If the point on the n-factor envelope (at the POI) is greater than this threshold value or critical point, then the flow at the flow near the POI is considered turbulent.

The threshold value of the n-factor for the onset of turbulence may be determined empirically for a given set of conditions. For example, for aircraft surfaces in wind tunnels, the n-factor critical point for TS waves may occur at a value ranging from 5 to 9. For aircraft surfaces in atmospheric flight, the n-factor critical point for TS waves may occur at a value ranging from 8 to 14.

The operations of the exemplary technique above have been described with respect to a single POI on the computer-generated aircraft surface used to determine a point on an n-factor envelope. To determine other points on the n-factor envelope and construct an n-factor envelope curve, portions of the above process can be repeated using other points of interest (POIs) on the computer-generated aircraft surface. For example, the operations 402, 408, 410, and 412 may be repeated for as many points as necessary to obtain a satisfactory resolution for the n-factor envelope across the computer-generated aircraft surface. Exemplary n-factor envelope curve are shown as profiles in FIGS. 12 and 13 and as a shaded plot in FIG. 2.

Figure 7:
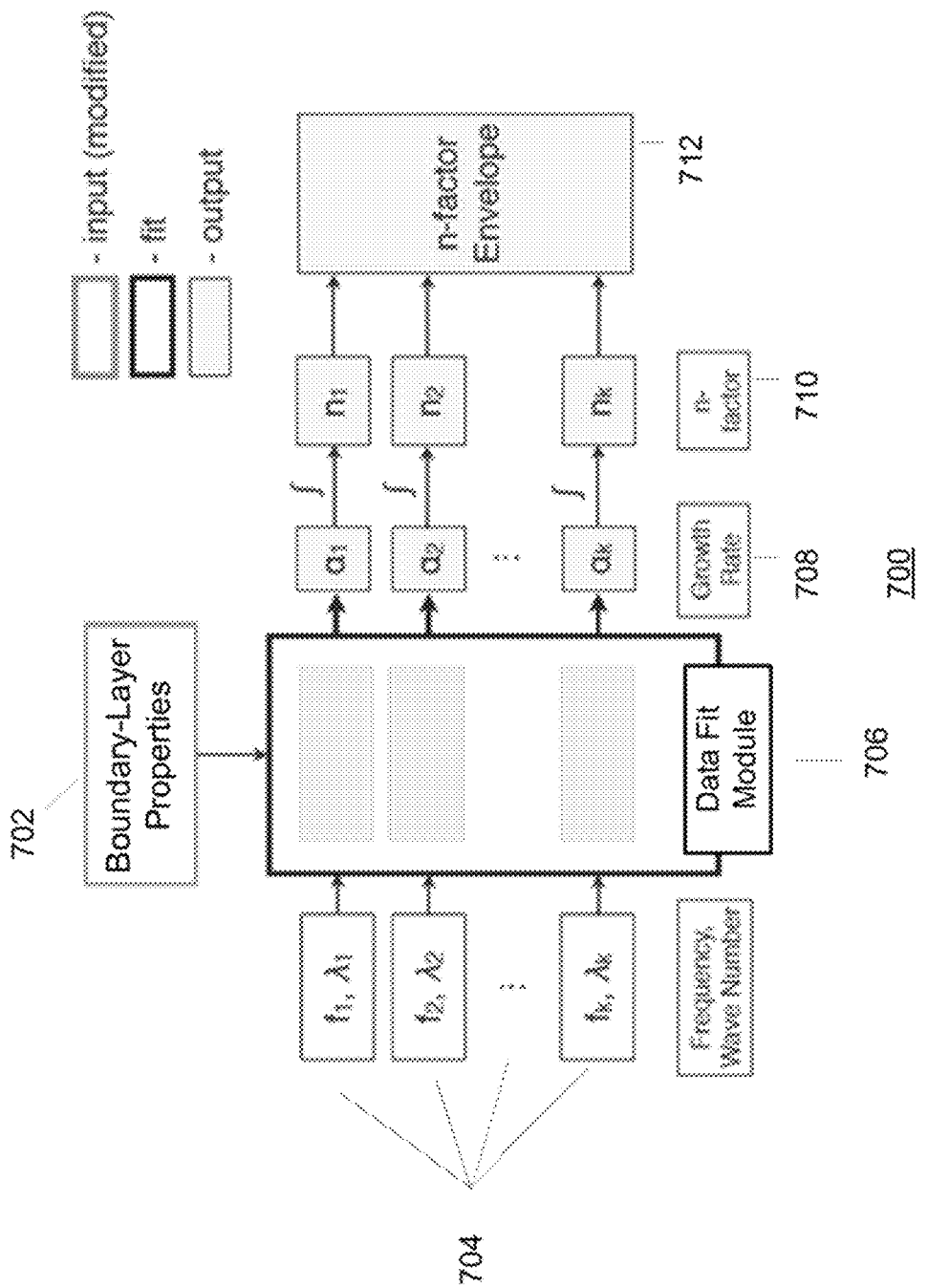
FIG. 7 depicts a data flow for transition prediction according to an exemplary technique.

FIG. 7 depicts a data-flow chart 700 for the exemplary process 400 described above with respect to FIG. 4. The boundary-layer properties 702 obtained from operation 402 and the instability modes 704 obtained from operation 404 are used as inputs to the data fit module 706 that represents operations 406, 408, and 410 above. The data fit module 706 outputs the growth rates 708 discussed above in operation 410 for each instability mode 704 defined by instability mode parameters temporal frequency f and spanwise wave number $\lambda$. As described in operation 412, based on the instability local growth rates 708 for the instability modes 704, an n-factor 710 is calculated for each of the instability modes 704. The individual n-factors are then used to create an n-factor envelope 712. The fluid flow can be considered as transitioning from laminar to turbulent fluid flow at the points or locations closest to the leading edge on the aircraft surface where the n-factor envelope 712 first exceeds a threshold value or critical point.

Figure 8:
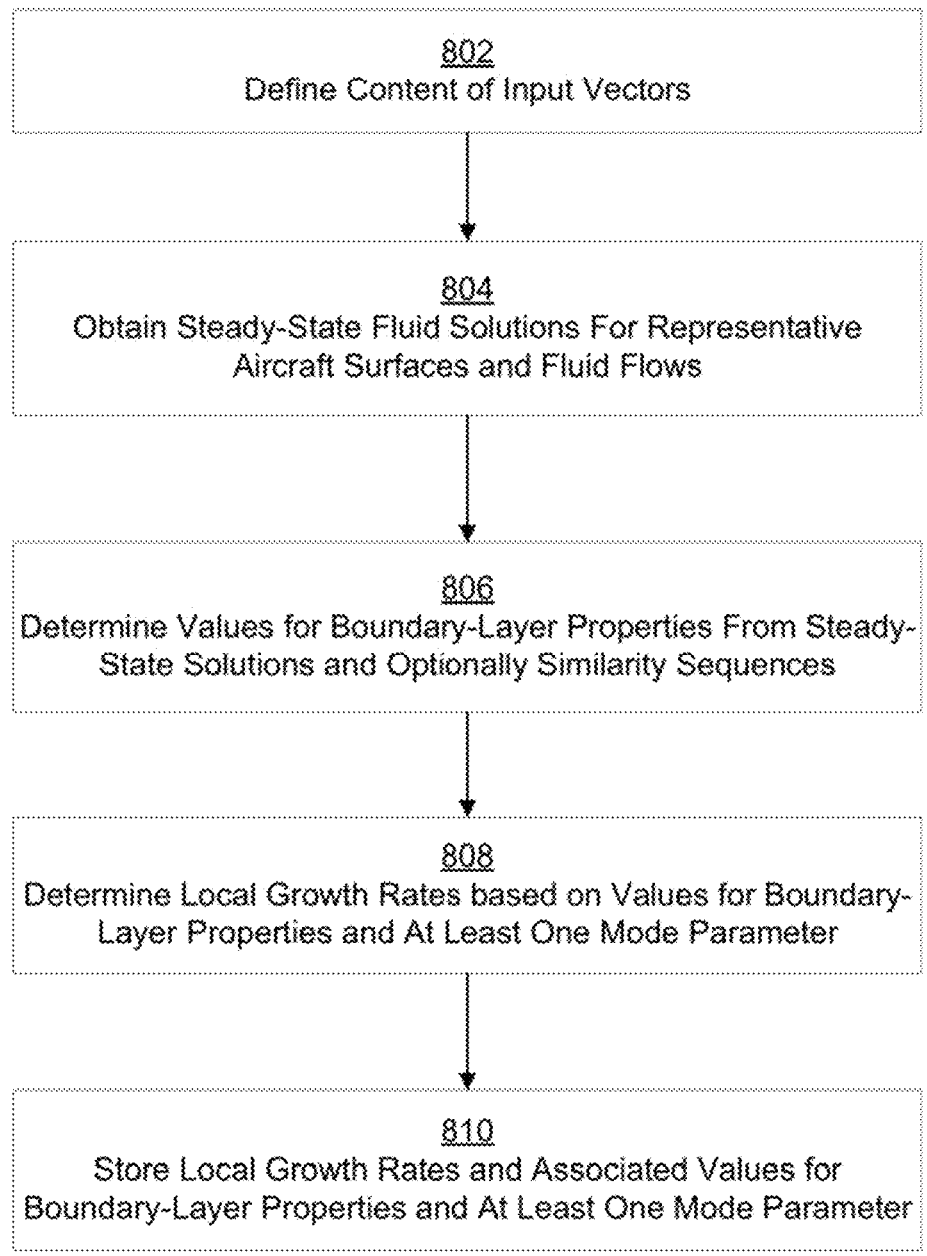
FIG. 8 depicts an exemplary process for generating a training dataset.

The flow chart of FIG. 8 depicts an exemplary process 800 for generating a training dataset. As described above, operation 406 may need access to the training dataset and operation 408 does need access to the training dataset. As briefly discussed above, the training dataset contains known instability growth rates and an associated input vector for each known instability growth rate. The input vector associated with each known instability growth rate represents the inputs to the analysis used to produce to the known instability local growth rate.

In operation 802 of the process 800 for generating the training dataset, the content of the input vectors is defined. The training input vectors include boundary-layer properties and one or more mode parameters. As discussed above in conjunction with operation 402, the boundary-layer properties used in the input vectors may vary depending on the type of instability being considered. The same boundary-layer properties discussed with respect to FIGS. 6 and 7 above, for TS-waves and stationary crossflow vortices, respectively, may be selected for inclusion in the training input vectors.

Like the boundary-layer properties, the relevant mode parameters may depend on the type of instability being considered. A similar process for choosing the one or more mode parameters as discussed above with respect to operation 404 may be used to define the one or more mode parameters included in the training input vectors. For example, both spanwise wave number and temporal frequency may be important when considering TS-wave instabilities. Alternatively, when considering stationary crossflow vortices, the temporal frequency may always be zero and only the spanwise wavenumber is needed. Therefore, when considering TS-wave instabilities, the training input vectors may include both a spanwise wavenumber and a temporal frequency for the mode, but when considering stationary crossflow vortices, the training input vectors may include the spanwise wavenumber without the temporal frequency.

Boundary-layer properties and mode parameters used in the training input vectors may also be selected depending on the desired quality of the dataset. In general, a large training input vector may provide a training dataset that enables a more robust prediction when used in the exemplary technique. However, larger training input vectors may also produce a training dataset that is more computationally intensive to use in the exemplary technique.

In operation 804, a representative set of computer-generated aircraft surfaces and fluid flows are obtained. For example, aircraft surfaces with varying characteristics (e.g., wings having different airfoil profiles or sweep angles) may be selected or defined by the user. For each combination of a selected computer-generated aircraft surface and a selected fluid flow, a CFD module or some other suitable means calculates a steady-state solution.

In operation 806, boundary-layer properties and a corresponding boundary-layer solution are determined using each steady-state solution determined in operation 804. For each steady-state solution, values for the same set of boundary-layer properties are determined. The boundary-layer properties may include, for example, temperature, a local velocity vector, Mach number, Reynolds number, or pressure gradient.

Optionally in operation 806, boundary-layer properties and solutions may also be determined based on similarity sequences. This may be suitable if LST-based analysis is being used to produce growth rates but may not if other analysis techniques are being used. A similarity sequence allows for generation of boundary-layer properties and solutions by modifying the shape of the boundary layer extracted from an existing steady-state solution. For example, the boundary-layer solution determined from a steady-state solution from operation 804 may be modified to generate a new boundary-layer solution and corresponding set of boundary-layer properties by warping the boundary-layer profiles in some advantageous manner. This is done without having to perform additional CFD simulations or empirical analysis and may be particularly helpful when certain values of the boundary-layer properties are desired for the training dataset, but it is difficult to find aircraft surfaces for which operation 804 will produce those desired values. For example, a similarity sequence can be generated by warping the boundary layer at a single streamwise station. This may be done by, for example, by scaling the warped boundary-layer profile, (e.g., the local velocity profiles 502 and 506 and the temperature profile) by the square root of the distance from the leading edge to fill all streamwise stations with similar boundary-layer profiles. In this example, the boundary-layer properties extracted from the new similarity sequence will still cover the same parameters (e.g., temperature value, local velocity vector values) but the values for those parameters will be adjusted.

In operation 808, instability local growth rates are determined. These growth rates become the known instability local growth rates. In an example of operation 808, LST-based analysis is performed using the multiple sets of boundary-layer properties as determined in operation 806. LST-based analysis is described in more detail below with respect to FIG. 15. For each set boundary-layer properties, LST-based analysis is performed for one or more instability modes. As discussed above, this operation may require that the user interact with LST-based analysis to check for lost modes and non-physical results. However, once the dataset is created, LST-based analysis is not needed to perform the exemplary technique as discussed above with respect to FIG. 4.

In operation 810, the local growth rates produced in operation 806 are stored in the dataset. In addition, each local growth rate is also associated with an input vector having contents as defined in operation 802 and includes at least one mode parameter and the boundary-layer properties that were determined from the same inputs to the analysis in operation 808 that produced the instability local growth rate.

Every possible combination of modes and boundary-layer properties cannot be expressly included in the dataset. The exemplary technique as discussed above with respect to FIG. 4 enables interpolation of the results in the training dataset allowing for accurate estimates of growth rates under conditions not specifically in the training dataset.

Figure 9:
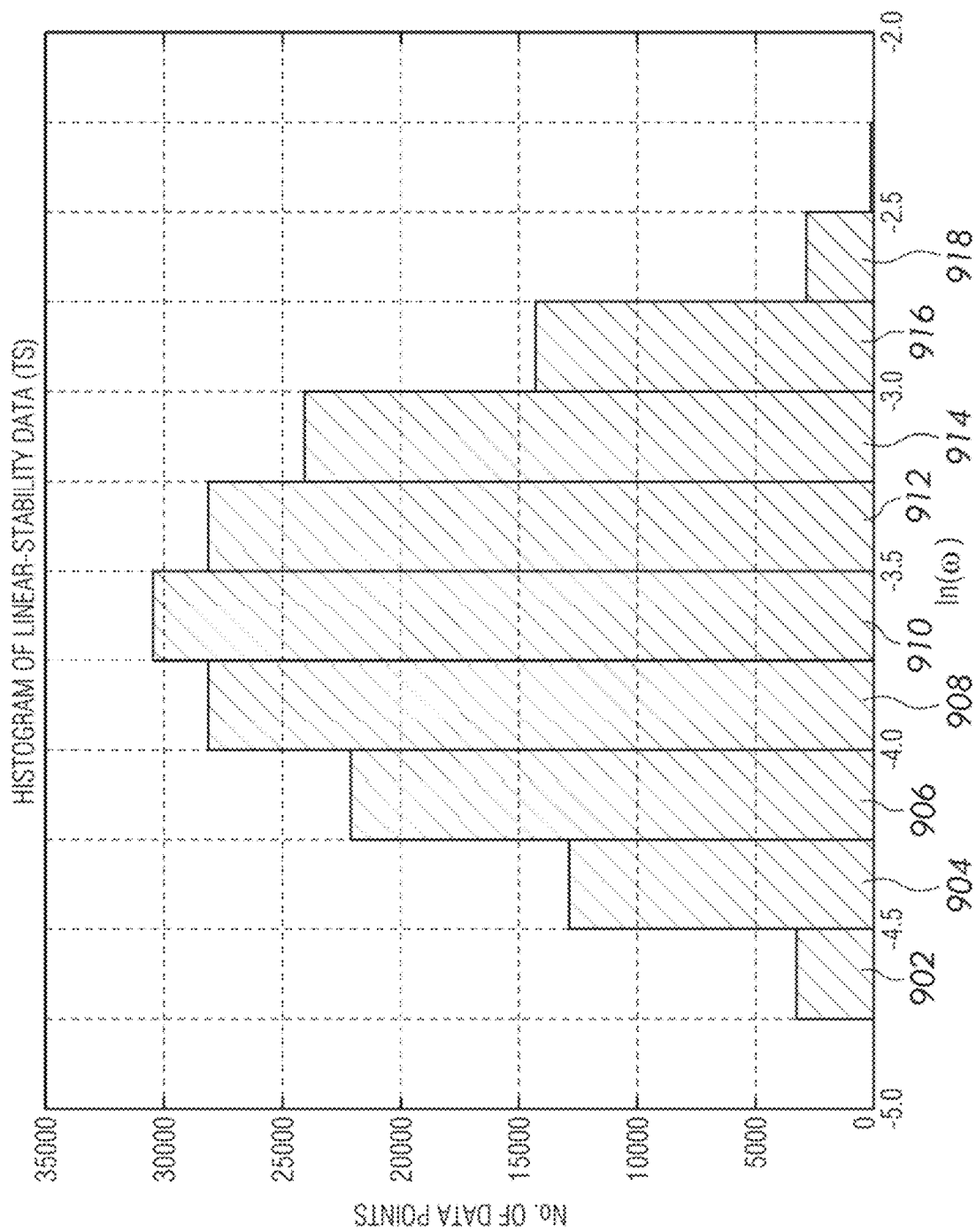
FIG. 9 depicts a partition of a dataset of known growth-rate results based on temporal frequency of the mode associated with the result.

In one example, training dataset is partitioned and only the partitions of the training dataset are used in the exemplary technique described above with respect to FIG. 4. This may be useful, for example, if the dataset is too large to feasibly create a covariance matrix of the entire dataset. In this case, the dataset may be partitioned and a covariance matrix and a vector of regressor weights may be constructed for each partition in accordance with the exemplary technique. For example, with reference to FIG. 9, the training dataset may be partitioned based on the temporal frequency of the mode associated with the growth rate. A covariance matrix and a vector of regressor weights may then be calculated for each partition 902, 904, 906, 908, 910, 912, 914, 916, 918.

In a similar example, the training dataset may also be partitioned based on spanwise wave length or spanwise wave number. If many partitions are necessary, it may be advantageous to allow the partitions to overlap slightly. This overlap can be used for smooth interpolation between partitions when computing an instability wave that crosses the training dataset partitions.

In another example, all of the data in the training dataset or all of the data in a particular partition is not needed. In this example, only a training subset of the training dataset or the partition is used. Individual datapoints (i.e., known instability growth rates and associated training input vectors) are added to the training subset until the exemplary technique described above with respect to FIG. 4 can predict some threshold number of the known instability growth rates that are not in the training subset to a threshold error tolerance. Optionally, in adding data to the training subset, priority can be given to those datapoints with known instability growth rates that the exemplary technique predicts with the highest error using the current training subset. Addition of datapoints to the training subset may continue until the training subset meets some error tolerance. For example, individual datapoints may be added to the training subset until the exemplary technique predicts 90% of the known instability growth rates not in the training subset with error not exceeding 10% of the known instability growth rate.

In a further example, all of the data in the training dataset or all of the data in a particular partition is not needed. In this example, an a priori method may be used to reduce the number of points in a dataset. Rather than determining the points to keep based on a threshold error tolerance as described above, a more traditional curve fitting method may be used such as discarding points in regions where the quantity of interest (such as the growth rate of the instabilities) changes slowly or gradually. Particular known values of n-factor may also be used to choose points such as n-factor values near zero to more accurately determine the neutral point of the instability wave and values near the critical n-factor value that is used to determine transition location.

Operations 802, 804, 806, 808, and 810 may be performed by an end user, a third party vendor, or other suitable party. Additionally, different operations may be performed by different parties. For example, if an end user does not have experience with LST-based analysis, the end user may have a third party vendor perform operation 808 only. In another example, an end user may have a third party vendor perform all operations and supply only the training dataset, the training partitions, or the training subsets. In yet another example, a third party vendor may generate the training dataset but the end user will partition the dataset or determine what subset of the dataset to use. In still yet another example, a user may obtain a training dataset from a third party vendor and then add additional data to the training dataset to customize it for the user's needs. This may be useful, for example, if a confidence measure of the predicted local instability growth rates or the n-factors according the exemplary technique indicates an unacceptable level of error.

Figure 15:
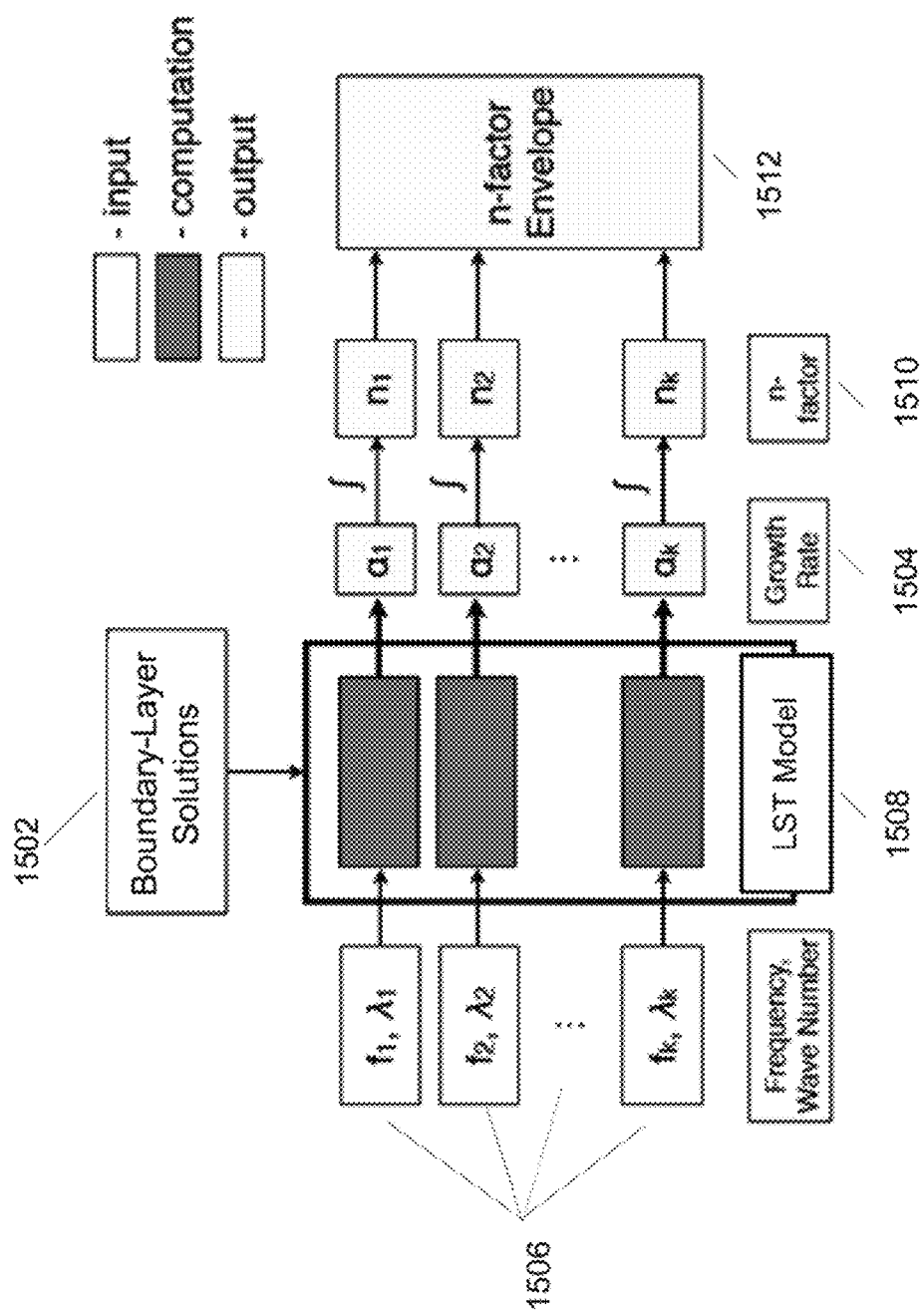
FIG. 15 depicts a data flow for transition prediction using linear stability theory.

FIG. 15 depicts a data flow for an LST-based analysis used to predict a transition point. As discussed above, LST-based analysis may be used in generating the training dataset. FIG. 15 depicts how LST-based analysis uses boundary-layer solutions 1502, provided by, for example, a CFD simulation module, to determine local growth rates 1504 of individual instability modes 1506 in the boundary-layer region of the fluid flow. LST-based analysis 1508 uses selected mode parameters 1506 (e.g., wave number $\lambda_k$ and frequency $f_k$) and boundary-layer solutions (e.g., local velocity, and temperature profiles) to compute a streamwise dimensionless wavelength and a local streamwise amplification factor. These two quantities are used in a complex-valued eigenvalue analysis that determines the instability local growth rates 1504 as modeled by a linear-dynamical system. The type of instability (e.g., TS wave or crossflow vortex) associated with the instability local growth rate is determined based on the eigenvector solution corresponding to the eigenvalue, which is also an output of the LST-based analysis. Thus, regardless of the type of instability, the LST-based analysis is the same. The type of instability is determined based on the physical behavior of the wave.

LST-based analysis results are generally considered to be accurate under many conditions. An example of an LST-based analysis tool is the LASTRAC software tool developed by NASA.

Using the growth rates 1504, an n-factor 1510 can be determined for each of the selected modes 1506. Referring to FIG. 15, based on LST-based analysis results, n-factors 1510 for each instability mode 1506 are calculated. An n-factor represents the natural logarithm of the ratio of amplification of an individual instability mode at a given point to its initial amplification at its neutral point. The n-factor represents the amplification or attenuation of an instability mode at a given point on the aircraft surface. As discussed above, if the n-factor reaches a threshold or critical point, the flow may be considered turbulent.

An n-factor envelope 1512 is determined using the n-factors from each selected instability mode 1506. N-factor envelope 1512 represents a composite of the n-factors for all of the selected instability modes 1506. In some cases, the n-factor envelope 1512 represents the largest n-factor at a given point for a set of selected instability modes 1506. For example, the n-factor envelope 1512 may be calculated by taking the point-wise maximum of the n-factors of the individual instability modes in the envelope.

Figure 10:
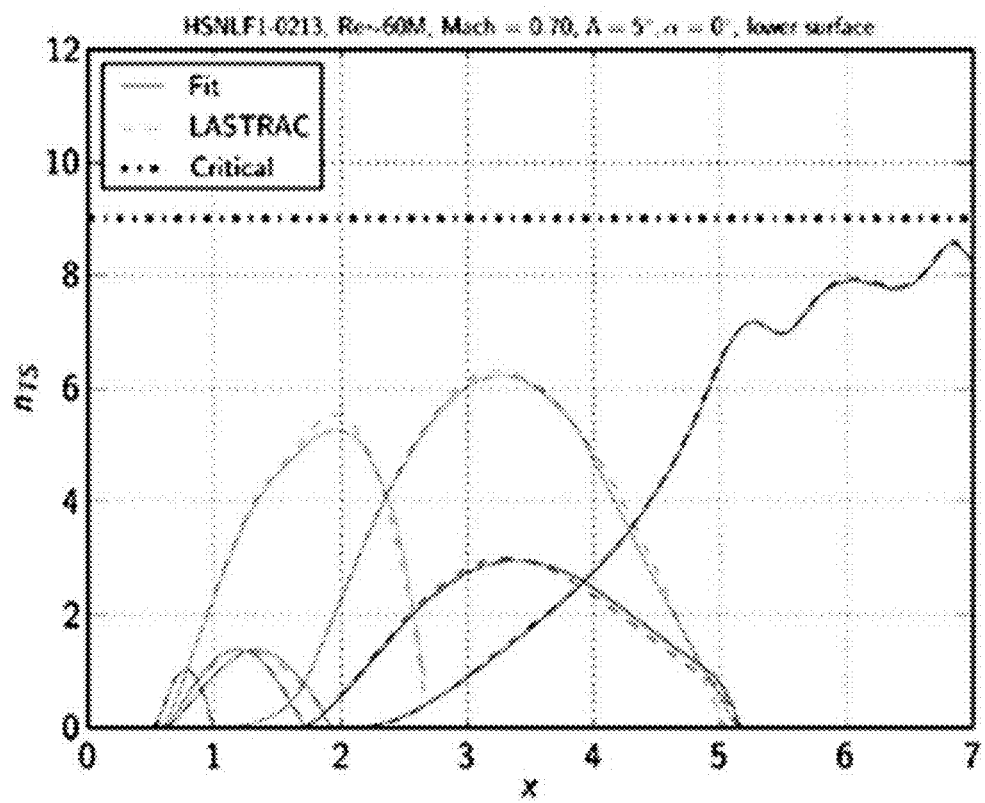
FIG. 10 depicts results of an exemplary process for modeling the n-factors for individual modes of TS-wave instabilities.
Figure 11:
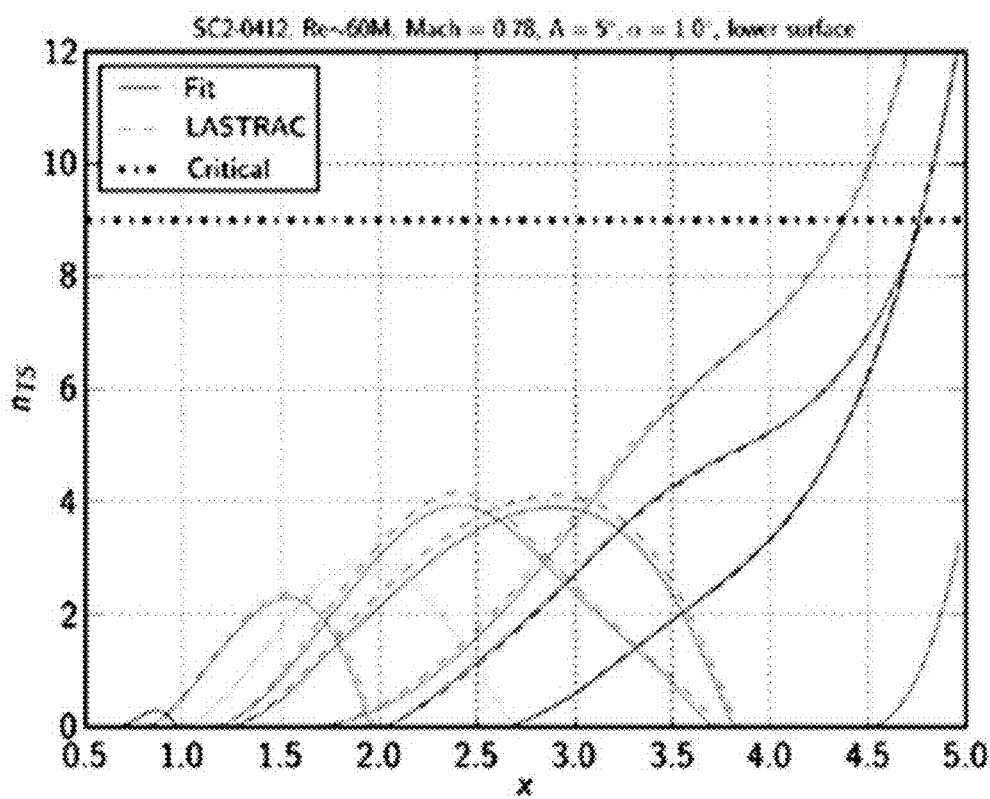
FIG. 11 depicts results of an exemplary process for modeling the n-factors for individual modes of TS-wave instabilities.
Figure 12:
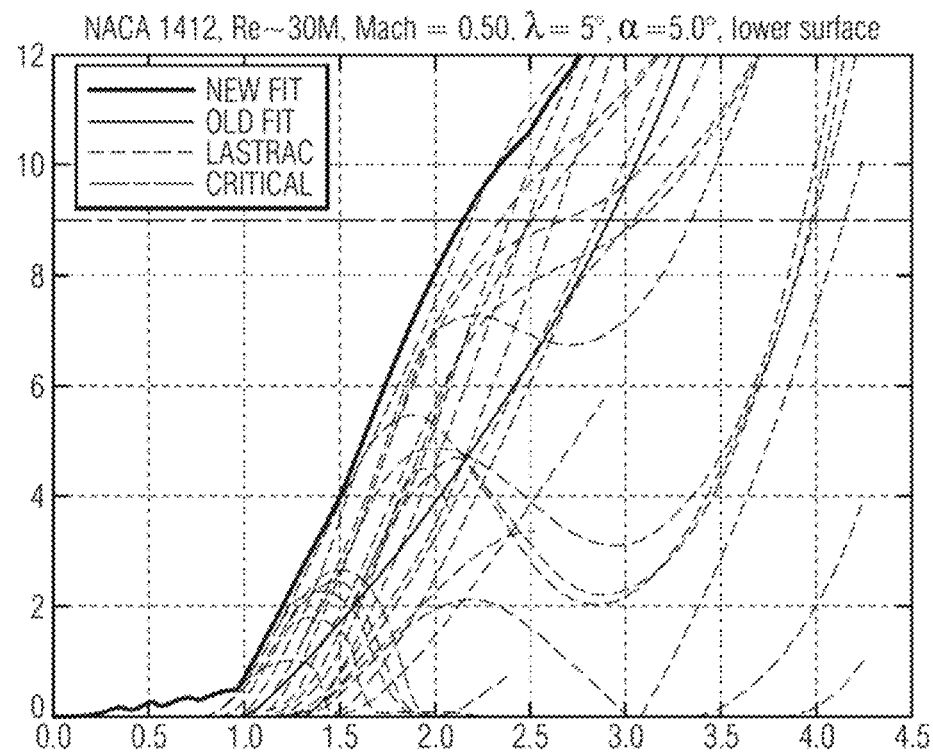
FIG. 12 depicts results of an exemplary process for modeling the n-factor envelope for TS-wave instabilities.
Figure 13:
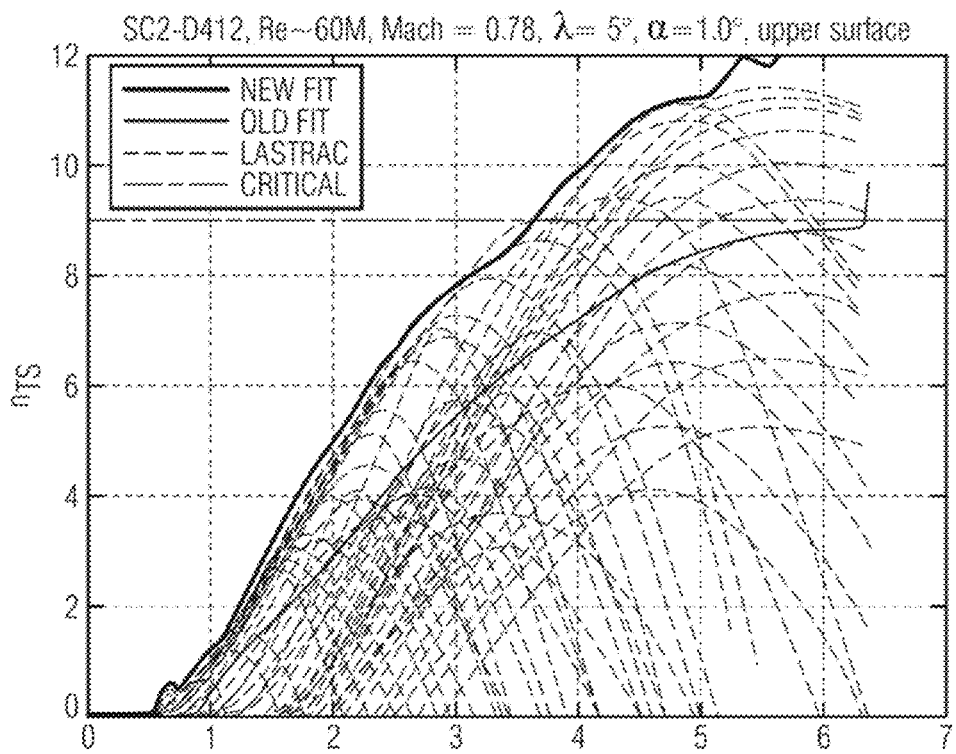
FIG. 13 depicts results of an exemplary process for modeling the n-factor envelope for TS-wave instabilities.

An exemplary prediction technique based on the technique described above was tested using wing surfaces having airfoil cross sections as shown in FIG. 14. TS-wave instability n-factor results for individual modes are shown in FIGS. 10 and 11. TS-wave results for the n-factor envelopes are shown in FIGS. 12 and 13. For the purposes of these results, the threshold value or critical point is assumed to be 9.

Computer-generated aircraft surfaces based on airfoil cross sections shown in FIG. 14 were obtained. The following boundary-layer conditions were then selected for each aircraft surface:

Untapered wings with aspect ratio of 10;
Leading-edge sweep: 0°, 5°, 15°, 35°;
Chord Reynolds numbers: 6, 30, 60 million; and
Angle of attack: 0°, 5°.

For each steady-state flow solution, LST-based analysis was used to determine instability local growth rates for individual modes. Additionally, LST-based analysis was used with similarity sequences as well to produce additional instability local growth rates. Because TS-wave instabilities were being considered, the growth rates were then stored in a dataset with the wave number, the mode frequency, the Reynolds number, the local Mach number, five points along the streamwise velocity profile, five points along the cross-flow velocity profile, five points along the temperature profile, and the angle between the reference axis and the external streamline. Initially, a dataset of about 300,000 known instability growth rates with associated input vectors was generated.

The dataset was partitioned based on mode frequency. The exemplary technique described above with respect to FIG. 4 was performed using a subset of the partitions.

FIGS. 10 and 11 are graphs showing a comparison among n-factors for individual instability modes calculated with the exemplary technique described above with respect to FIG. 4 and LST-based analysis. FIGS. 12 and 13 are graphs of n-factor envelope results according to an envelope modeling technique, n-factor envelope results according to an exemplary transition prediction technique, and individual instability mode n-factor results as calculated by LST-based analysis. As can be seen, the n-factor envelope calculated based on the exemplary transition prediction technique better predicts the results of the LST-based analysis as compared to the envelope modeling technique.

Figure 16:
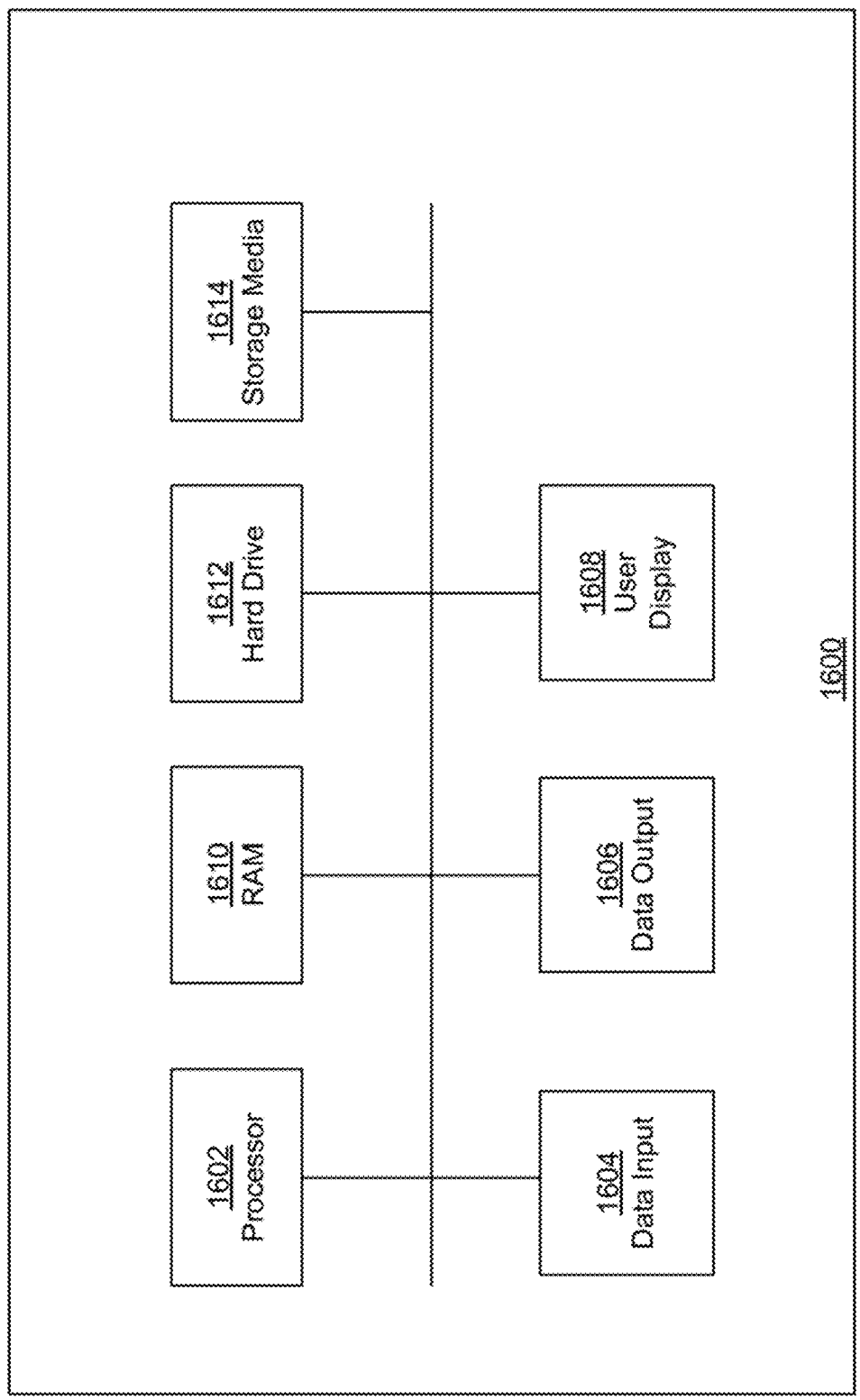
FIG. 16 depicts an exemplary computer system for simulating fluid flow over computer generated aircraft surface.

The techniques described herein are typically implemented as computer software (computer-executable instructions) executed on a processor of a computer system. FIG. 16 depicts an exemplary computer system 1600 configured to perform any one of the above-described processes. Computer system 1600 may include the following hardware components: processor 1602, data input devices (e.g., keyboard, mouse, keypad) 1604, data output devices (e.g., network connection, data cable) 1606, and user display (e.g., display monitor) 1608. The computer system also includes non-transitory memory components including random access memory (RAM) 1610, hard drive storage 1612, and other computer-readable storage media 1714.

Processor 1702 is a computer processor capable of receiving and executing computer-executable instructions for performing any of the processes described above. Computer system 1600 may include more than one processor for performing the processes. The computer-executable instructions may be stored on one or more types of non-transitory storage media including RAM 1610, hard drive storage 1612, or other computer-readable storage media 1614. Other computer-readable storage media 1614 include, for example, CD-ROM, DVD, magnetic tape storage, magnetic disk storage, solid-state storage, and the like.

Figure 17:
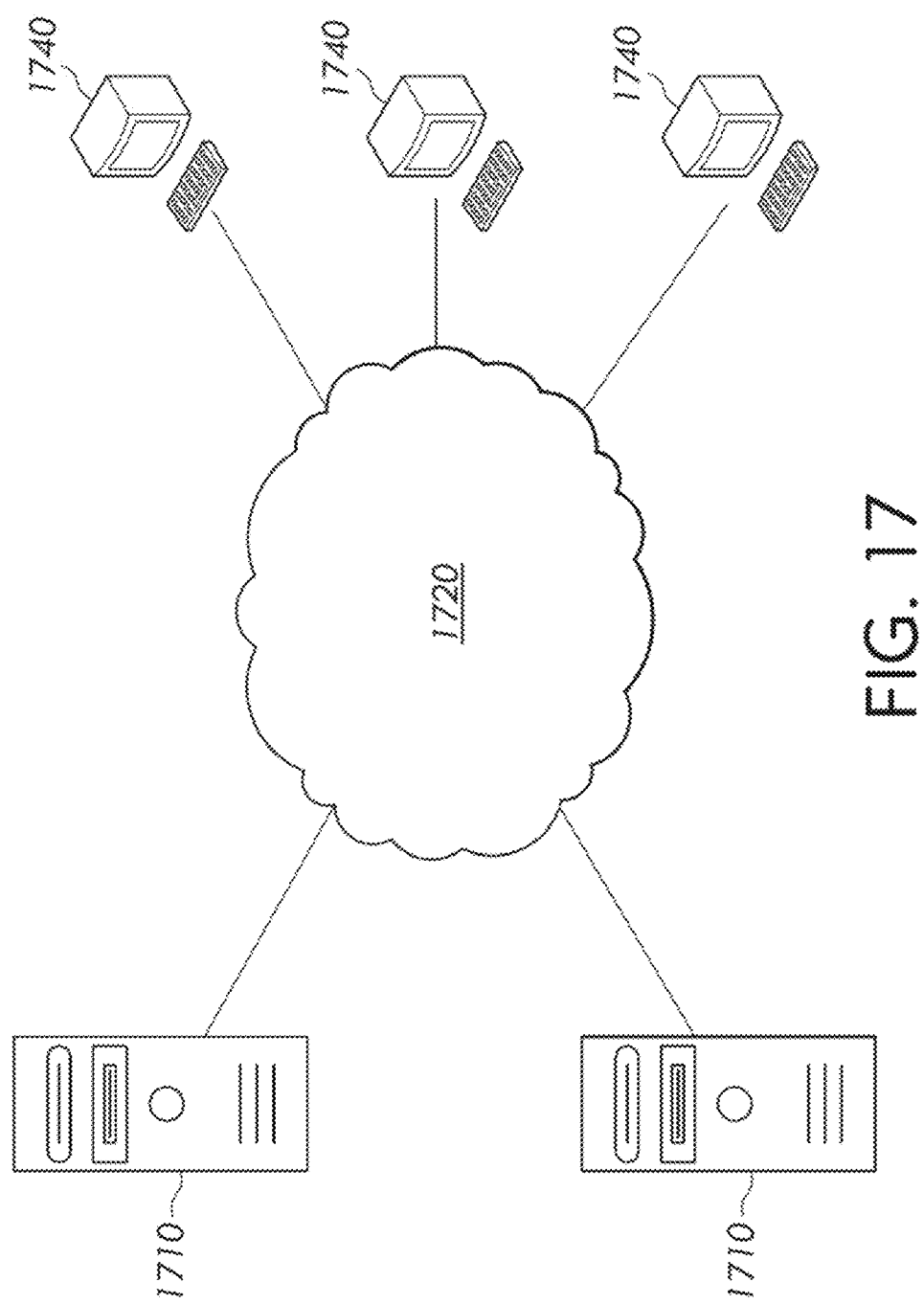
FIG. 17 depicts an exemplary computer network.

FIG. 17 depicts an exemplary computer network for distributing the processes described above to multiple computers at remote locations. One or more servers 1710 may be used to perform portions of the process described above. For example, one or more servers 1710 may store and execute computer-executable instructions for receiving information for generating a computer-generated simulation. The one or more servers 1710 are specially adapted computer systems that are able to receive input from multiple users in accordance with a web-based interface. The one or more servers 1710 are able to communicate directly with one another using a computer network 1720, including a local area network (LAN) or a wide area network (WAN), such as the Internet.

One or more client computer systems 1740 provide an interface to one or more system users. The client computer systems 1740 are capable of communicating with the one or more servers 1810 over the computer network 1720. In some embodiments, the client computer systems 1840 are capable of running a Web browser that interfaces with a Web-enabled system running on one or more server machines 1710. The Web browser is used for accepting input data from the user and presenting a display to the user in accordance with the exemplary user interface described above. The client computer 1740 includes a computer monitor or other display device for presenting information to the user. Typically, the client computer 1870 is a computer system in accordance with the computer system 1600 depicted in FIG. 16.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A computer-implemented method for predicting a flow condition for a transition point along a computer-generated surface, the method comprising:

obtaining a set of boundary-layer properties associated with a simulated fluid flow over the computer generated surface;

obtaining one or more mode parameters associated with an instability mode;

obtaining a vector of values associated with a set of known instability growth rates of a training set;

determining a covariance vector including a covariance of a predicted local growth rate for the transition point with respect to each of the set of known instability growth rates;

determining the predicted local growth rate at the transition point using the vector of values and the covariance vector; and determining an n-factor envelope at the transition point for the instability mode using the predicted local growth rate, wherein the n-factor envelope is indicative of whether the transition point is adjacent to laminar or turbulent flow.

2. The computer-implemented method of claim 1, wherein the set of boundary-layer properties includes a flow velocity and a temperature profile for the simulated fluid flow proximate to the transition point.

3. The computer-implemented method of claim 1, wherein the set of boundary-layer properties includes a set of coefficient weights that corresponds to one or more mode-based profiles.

4. The computer-implemented method of claim 3, wherein the one or more mode-based profiles are derived using a singular value decomposition.

5. The computer-implemented method of claim 1, wherein:
the computer-generated surface represents a surface of a wing; and
the method further comprises determining whether the simulated fluid flow at the transition point is turbulent or laminar based on whether the n-factor envelope at the transition point exceeds a threshold value.

6. The computer-implemented method of claim 5, wherein:
in response to the n-factor envelope at the transition point exceeding the threshold value, determining that the transition point is associated with turbulent flow; and
in response to the n-factor envelope at the transition point not exceeding the threshold value, determining that the transition point is associated with laminar flow.

7. The computer-implemented method of claim 1, wherein:
the instability mode is a first instability mode of a plurality of instability modes; and
the plurality of instability modes include one or more of: a Tollmien-Schlichting (TS) wave instability mode or a crossflow vortices mode.

8. The computer-implemented method of claim 1, wherein the vector of values is a vector of regressor weights of the set of known instability growth rates.

9. The computer-implemented method of claim 8, wherein:
the vector of regressor weights is based on a covariance matrix;
the covariance matrix includes elements that are a covariance of a first known instability mode with respect to a second known instability mode; and
the covariance of the first known instability mode with respect to the second known instability mode is based on a distance between a first and a second training input vector associated with a first and a second known instability growth rate, respectively.

10. The computer-implemented method of claim 9, wherein the covariance matrix and the covariance vector are based on a squared exponential covariance function.

11. A system for predicting a transition from laminar to turbulent flow over a computer-generated surface, the system comprising:
a display;
a processor operably coupled to the display; and
computer-readable memory storing computer-executable instructions for execution on the processor, the computer-executable instructions including instructions for:
obtaining a set of flow properties associated with a simulated fluid flow over the computer-generated surface, the set of flow properties including a set of coefficient weights;
obtaining one or more mode parameters associated with an instability mode;
obtaining a vector of regressor weights associated with a set of known instability growth rates;
determining a covariance vector including a covariance of a predicted local growth rate for a point along the computer-generated surface with respect to each of the set of known instability growth rates;
determining the predicted local growth rate at the point using the vector of regressor weights and the covariance vector; and
determining an n-factor envelope at the point for the instability mode using the predicted local growth rate, wherein the n-factor envelope is indicative of whether the point is adjacent to laminar or turbulent flow.

12. The system of claim 11, wherein:
the set of coefficient weights corresponds to one or more mode-based profiles; and
the one or more mode-based profiles are derived using a singular value decomposition.

13. The system of claim 11, wherein:
the set of known instability growth rates is part of a training dataset;
the training dataset includes a training input vector associated with each known instability growth rate of the set of known instability growth rates;
each training input vector includes training boundary layer properties and at least one training instability mode parameter;
the vector of regressor weights is based on a covariance matrix that has elements that are the covariance of a first known instability mode with respect to a second known instability mode; and
the covariance of the first known instability mode with respect to the second known instability mode is based on a distance between a first and a second training input vector associated a first and a second known instability growth rate, respectively.

14. The system of claim 11, wherein:
the computer-generated surface represents a surface of an airplane;
the instructions further comprise instructions for determining whether the simulated fluid flow at the point is turbulent or laminar based on whether the n-factor envelope at the point exceeds a threshold value;
in response to the n-factor envelope at the point exceeding the threshold value, determining that the transition point is associated with turbulent flow; and
in response to the n-factor envelope at the point not exceeding the threshold value, determining that the transition point is associated with laminar flow.

15. A computer system comprising:
computer memory storing computer-executable instructions;
a processor configured to execute the computer-executable instructions, the computer-executable instructions for:
obtaining a set of flow properties associated with a simulated fluid flow over a computer-generated surface, the set of flow properties including a set of coefficient weights;

obtaining one or more mode parameters associated with each of a set of instability modes;

obtaining a vector of regressor weights associated with a set of known instability growth rates;

determining a covariance vector including a covariance of a predicted local growth rate for a point along the computer-generated surface with respect to each of the set of known instability growth rates;

determining the predicted local growth rate at the point using the vector of regressor weights and the covariance vector; and determining an n-factor envelope at the point for an instability mode using the predicted local growth rate, wherein the n-factor envelope is indicative of whether the point is adjacent to laminar or turbulent flow.

16. The computer system of claim 15, wherein:
the set of coefficient weights corresponds to one or more mode-based profiles; and
the one or more mode-based profiles are derived using a singular value decomposition.

17. The computer system of claim 15, wherein:
the computer-generated surface represents a surface of an aircraft;
the set of flow properties is associated with a supersonic flight condition; and
the computer-readable instructions further comprise instructions for determining if a shock wave is predicted to occur along the surface of the aircraft.

18. The computer system of claim 15, further comprising instructions for:
determining if the n-factor envelope exceeds a threshold for the point; and,
in response to the n-factor envelope exceeding the threshold, determining that the point is adjacent to turbulent flow.

19. The computer system of claim 15, wherein:
the set of known instability growth rates is part of a training dataset; and
the training dataset is generated with linear stability theory (LST) model analysis.

20. The computer system of claim 15, wherein:
the predicted local growth rate is associated with the set of flow properties and a mode parameter of the one or more mode parameters; and
the covariance of the predicted local growth rate with respect to a known instability growth rate is based on a distance from a flow property of the set of flow properties and the mode parameter to a training input vector associated with the known instability growth rate.

* * * * *